United States Patent
Bhattacharya et al.

(10) Patent No.: US 10,412,012 B2
(45) Date of Patent: Sep. 10, 2019

(54) INTELLIGENT, LOAD ADAPTIVE, AND SELF OPTIMIZING MASTER NODE SELECTION IN AN EXTENDED BRIDGE

(71) Applicant: ARRIS Enterprises LLC, Suwanee, GA (US)

(72) Inventors: Somen Bhattacharya, San Jose, CA (US); Rakesh Hansalia, Milpitas, CA (US); Ranganadh Muddana, Union City, CA (US); Senthil Paramasivam, Santa Clara, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 184 days.

(21) Appl. No.: 15/272,218

(22) Filed: Sep. 21, 2016

(65) Prior Publication Data

US 2017/0085488 A1 Mar. 23, 2017

Related U.S. Application Data

(60) Provisional application No. 62/222,019, filed on Sep. 22, 2015.

(51) Int. Cl.
*H04L 12/851* (2013.01)
*H04L 12/24* (2006.01)
*H04L 12/26* (2006.01)

(52) U.S. Cl.
CPC ...... *H04L 47/2425* (2013.01); *H04L 41/0806* (2013.01); *H04L 41/0813* (2013.01);
(Continued)

(58) Field of Classification Search
CPC ............ H04L 47/2425; H04L 41/0806; H04L 41/083; H04L 43/16
See application file for complete search history.

(56) References Cited

U.S. PATENT DOCUMENTS 6,950,855 B2 9/2005 Sampathkumar
7,558,835 B1 7/2009 Shafer
(Continued)

FOREIGN PATENT DOCUMENTS

| EP | 2696538 A1 | 2/2014 |
|---|---|---|
| WO | 2017062671 A1 | 4/2017 |
| WO | 2017070587 A1 | 4/2017 |

OTHER PUBLICATIONS

U.S. Appl. No. 15/276,579, filed Sep. 26, 2016 by Kwun-Nan Kevin Lin et al.
(Continued)

*Primary Examiner* — Derrick W Ferris
*Assistant Examiner* — Kevin H Lee
(74) *Attorney, Agent, or Firm* — Stewart M. Wiener

(57) ABSTRACT

Techniques for intelligent, load adaptive, and self optimizing master node selection in an extended bridge are provided. According to one embodiment, a controlling bridge (CB) node that is part of a plurality of CB nodes in the extended bridge can determine a set of local configuration parameters and a set of local runtime parameters. The CB node can further broadcast the set of local configuration parameters and the set of local runtime parameters to other CB nodes in the plurality of CB nodes. The CB node can also receive a set of configuration parameters and a set of runtime parameters from each of the other CB nodes in the plurality of CB nodes. The CB node can then determine a particular CB node in the plurality of CB nodes to be a master CB node of the extended bridge based on the set of local configuration parameters, the set of local runtime parameters, the received sets of configuration parameters, and the received sets of runtime parameters.

20 Claims, 8 Drawing Sheets

(52) U.S. Cl.
CPC .......... *H04L 41/30* (2013.01); *H04L 41/0213* (2013.01); *H04L 41/046* (2013.01); *H04L 41/083* (2013.01); *H04L 41/12* (2013.01); *H04L 43/06* (2013.01); *H04L 43/087* (2013.01); *H04L 43/0852* (2013.01); *H04L 43/16* (2013.01)

(56) References Cited

U.S. PATENT DOCUMENTS

| | | | |
|---|---|---|---|
| 7,675,869 | B1 | 3/2010 | Anker et al. |
| 2007/0104093 | A1* | 5/2007 | Li .................... H04L 12/437 370/223 |
| 2014/0156906 | A1 | 6/2014 | Babu et al. |
| 2014/0181275 | A1 | 6/2014 | Lin et al. |
| 2014/0269710 | A1* | 9/2014 | Sundaram ............ H04L 45/302 370/392 |
| 2015/0304247 | A1* | 10/2015 | Poggi .................... H04L 45/66 370/401 |
| 2015/0339249 | A1* | 11/2015 | Dharmadhikari ... G06F 13/4221 710/316 |
| 2017/0093628 | A1 | 3/2017 | Lin et al. |
| 2017/0104626 | A1 | 4/2017 | Lin et al. |
| 2017/0104665 | A1 | 4/2017 | Gowthaman |
| 2017/0104694 | A1 | 4/2017 | Lin et al. |
| 2017/0111296 | A1 | 4/2017 | Agarwal et al. |
| 2017/0118041 | A1 | 4/2017 | Bhattacharya et al. |
| 2017/0118042 | A1 | 4/2017 | Bhattacharya et al. |

OTHER PUBLICATIONS

U.S. Appl. No. 15/276,619, filed Sep. 26, 2016 by Kwun-Nan Kevin Lin et al.
U.S. Appl. No. 15/286,472, filed Oct. 5, 2016 by Bipin Agarwal et al.
U.S. Appl. No. 15/331,067, filed Oct. 21, 2016 by Somen Bhattacharya et al.
U.S. Appl. No. 15/331,160, filed Oct. 21, 2016 by Somen Bhattacharya et al.
Dell Networking Configuration Guide for the C9000 Series, Version 9.9 (0.0), Oct. 2015, 1148 pages.
U.S. Appl. No. 151489,395, filed Apr. 17, 2017 by Kwun-Nan Kevin Lin.
Cisco Nexus 5600 Series NX-OS Layer 2 Switching Configuration Guide, Release 7.x; Mar. 15, 2014; Cisco Systems, Inc.; 280 pages.
Configuring the Fabric Extender, Chapter 2; Cisco Nexus 2000 Series Fabric Extender Software Configuration Guide; 16 pages.
Configuring Port Extender Stack; Dell Networking C9010/C1048P; Jan. 30, 2017; https://qrl.dell.com/Files/enus/Html/C9010_C1048P/Configuring%20PE%20Stack.html; 3 pages.
Understanding Junos Fusion Provider Edge Components; Technical Documentation—Support—Juniper Networks; Mar. 31, 2017; 5 pages; https://www.juniper.net/documentation/en_US/junos/topics/concept/fusion-components.html.
U.S. Appl. No. 15/229,012, filed Aug. 4, 2016 by Lin et al.
U.S. Appl. No. 15/243,782, filed Aug. 22, 2016 by Ramesh Gowthaman.
Chandra Konathala: Bridge port Extension—802.1B; Brocade; Mar. 3, 2014; 38 pages.
Cisco IOS Command Modes; http://www.cisco.com/c/en/us/td/docs/ios/12_2/configfun/configuration/guide/ffun_c/fcf019.html#wp1000922; Mar. 25, 2016; 20 pages.
Dev Datta: EPI—Campus Satellite Solution; Brocade; Aug. 4, 2016; 13 pages.
Vignesh Hariharan: Campus Fabric; Brocade Communications Systems Inc.; 2015; 40 pages.
Selling Campus Fabric FY16, Introducing Campus Fabric; Brocade Communications Systems, Inc.; 2015; 18 pages.
Dell C9010 Module Switch Interoperability with Cisco Catalyst 3750, A Development Guide for Dell Networking Switches (v1.0), Dell Network Solutions Engineering, Sep. 2015, 24 pages.
Dell Networking C1048P Getting Started Guide, Sep. 2015, 26 pages.
Juniper Networks, Junos Fusion Provider Edge, Release 14.2R4, Feb. 17, 2016, 646 pages.
Cisco StackWise and StackWise Plus Technology, 2016 Cisco, Mar. 25, 2016, 11 pages.
Dell Stack Master Election, Dell Networking Configuration Guide for the C9000 Series Version 9.9 (0.0), Mar. 25, 2016, 1 page.
International Search Report and Written Opinion for International Appln. No. PCT/US2016/055827 dated Jan. 25, 2017, 15 pages.
Virtual Bridged Local Area Networks-Bridge Port Extension, IEEE Computer Society, IEEE Std 802.1 BR-2012, Jul. 16, 2012, 121 pages.
Brocade Fastlron Switch Port Extender, Configuration Guide, Supporting FastIron Software Release 8.0.40, Feb. 29, 2016, 88 pages.
International Search Report and Written Opinion for International Appln. No. PCT/US2016/058283 dated Feb. 17, 2017, 12 pages.
Lockwood et al., "Automated Tools to Implement and Test Internet Systems in Reconfigurable Hardware", ACM SIGCOMM Computer Communications Review, vol. 33, No. 3, Jul. 2003, pp. 103-110.
U.S. Appl. No. 15/595,747, filed May 15, 2017 by Bipin Agarwal.

* cited by examiner ial, and Self Optimizing Master Node Selection in an Extended Bridge

CROSS-REFERENCE TO RELATED APPLICATION

The present application claims the benefit and priority of U.S. Provisional Application No. 62/222,019, filed Sep. 22, 2015, entitled "Intelligent, Load-Adaptive, and Self Optimizing Master Node Selection in a Virtual Chassis Topology with Port Extender Nodes," the entire contents of which are incorporated herein by reference in its entirety for all purposes.

BACKGROUND

In recent years, there has been growing interest in deploying extended bridges (i.e., networking systems that make use of Institute of Electrical and Electronics Engineers (IEEE) 802.1BR Port Extension technology) for various applications like campus networks, virtualized data centers (VDCs), virtualized storage area networks (V-SANs), and so on. In an extended bridge (also known as a "virtual chassis system/topology"), controlling bridge (CB) nodes are responsible for configuration and control of Port Extender (PE) switching nodes. The CB nodes are often implemented using higher-end networking hardware (e.g., routers/switches) with greater traffic processing capabilities, while the PE nodes are often implemented using small to medium-sized low-power hardware that need to be efficient in terms of energy consumption and processing capabilities.

The PE nodes are generally connected in a tree topology with a CB node being the root of the tree. The leaf-level PE nodes are known as edge PE nodes and the PE nodes at tree branch points are known as transit PE or cascade PE nodes. The leaf-level PE nodes provide services to various end hosts or virtual machines (VMs) in VDCs. For scaling purposes, an extended bridge may include multiple PE trees, each rooted under a separate CB node, where the CB nodes themselves may be connected with each other in the form of a ring, mesh, or some other topology. Such an extended bridge topology with multiple rooted PE trees is sometimes referred to as a PE forest.

The IEEE 802.1BR standard requires that PE nodes be configured and controlled from a single point of management. Thus, in an extended bridge, a single CB node is generally designated as a master CB node that is responsible for configuration management of all other CB nodes and all PE nodes in the bridge. The master CB node is often heavily loaded compared to other CB nodes, since the master CB node is also responsible for running various control protocols, such as IGP routing (OSPF, IS-IS), BGP routing, security key distribution protocols, multicast routing, RSTP, MSTP, network management agents (SNMP, CLI, NETCONF, etc.), and the like. Accordingly, to ensure a high level of network quality of service, service availability, and overall performance and throughput, it is important that the master CB node is appropriately elected from among the eligible CB nodes so that the elected master has sufficient resources and processing capabilities to perform optimal forwarding of user traffic with service level agreement (SLA) guarantees.

SUMMARY

Techniques for intelligent, load adaptive, and self-optimizing master node selection in an extended bridge are provided. According to one embodiment, a controlling bridge (CB) node that is part of a plurality of CB nodes in the extended bridge can determine a set of local configuration parameters and a set of local runtime parameters. The CB node can further broadcast the set of local configuration parameters and the set of local runtime parameters to other CB nodes in the plurality of CB nodes. The CB node can also receive a set of configuration parameters and a set of runtime parameters from each of the other CB nodes in the plurality of CB nodes. The CB node can then determine a particular CB node in the plurality of CB nodes to be a master CB node of the extended bridge based on the set of local configuration parameters, the set of local runtime parameters, the received sets of configuration parameters, and the received sets of runtime parameters.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure provide techniques for automatically reconfiguring and re-optimizing an extended bridge so that the extended bridge's internal network resources are optimally utilized. In one set of embodiments, these techniques can include intelligently electing a master CB node in the extended bridge (as well as one or more standby/backup CB nodes) based on various configuration and/or runtime parameters collected from topology nodes. This election process can result in more reliable and robust operation of the extended bridge and consequently a higher level of service delivered to end-users.

The embodiments of the present disclosure provide a number of distinct advantages. First, because certain embodiments provide for controlled and load adaptive traffic distribution via the extended bridge routers/switches along the IEEE 802.1BR PE distribution trees, there is minimal or no loss of user traffic that is forwarded/replicated and distributed down the subtree(s) towards receiving users. Further, since an end-user's traffic may be sensitive to packet loss or packet loss ratio, the minimization of traffic loss inside the PE distribution tree(s) facilitate the maintaining of quality of such delivered traffic.

Second, for an OEM partner or network operator, an important goal is to utilize the resources of the network efficiently, so that multiple different services can be provided to end-users/customers without violating their SLA contracts. Unmanaged or uncontrolled traffic loss or sub-optimal traffic forwarding within the interior of an extended bridge PE tree network not only impacts the quality of end-to-end services, but also leads to waste of network bandwidth resources due to repeated unsuccessful attempts by the traffic sources to forward the traffic towards the receiving end users. Thus, a network resource optimized traffic forwarding scheme as described herein can improve the effective utilization of network resources and thereby improve and/or guarantee the quality of service experienced by the receiving end-users.

Third, by taking into consideration the dynamic traffic load and/or resource availabilities within an extended bridge topology, these techniques allow for more effective and optimized traffic distribution through the extended bridge topology than alternative, static approaches.

2. System Architecture

Figure 1:
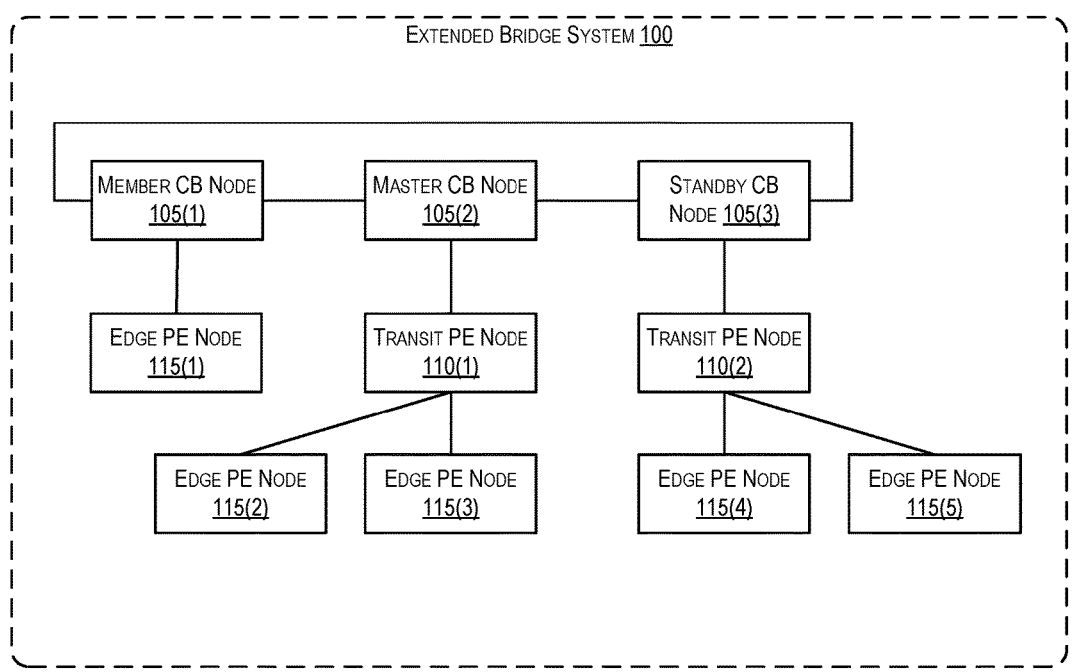
FIG. 1 depicts the topology of an example extended bridge according to an embodiment.

FIG. 1 depicts the topology of an example extended bridge 100 according to an embodiment. As shown, extended bridge 100 includes interconnected CB nodes 105(1)-(3), transit PE nodes 110(1)-(2), and edge PE nodes 115(1)-(5). CB nodes 105(1)-(3), transit PE nodes 110(1)-(2), and edge PE nodes 115(1)-(5) are network devices (e.g., routers and/or switches) that collectively function as a single logical router or switch within bridge 100 according to an IEEE 802.1BR bridge port extension standard. The interior links and interior network devices in extended bridge 100 form what is referred to as an extended bridge fabric. CB nodes 105(1)-(3) may be standard routers or switching devices while PE nodes (e.g., transit PE nodes 110(1)-(2) and edge PE nodes 115(1)-(5)) may be simpler devices built from lower cost hardware and are less sophisticated than the CB nodes.

In the example of FIG. 1, CB nodes 105(1)-(3) are linked together in the form of a closed circular ring that represents a hub layer of extended bridge 100. In addition, extended bridge 100 comprises multiple rooted PE trees (i.e., a PE forest). In particular, member CB node 105(1) and edge PE node 115(1) form a first rooted PE tree; master CB node 105(2), transit PE node 110(1), and edge PE nodes 115(2)-(3) form a second rooted PE tree; and standby CB node 105(3), transit PE node 110(2), and edge PE nodes 115(4)-(5) form a third rooted PE tree. Multiple PE devices can form a cascaded network and can be connected to a single CB device, called a parent CB device. As shown in FIG. 1, transit PE node 110(1) and edge PE nodes 115(2)-(3) form a cascaded network and are connected to parent CB node 105(2). Transit PE node 110(2) and edge PE nodes 115(4)-(5) form another cascaded network and are connected to parent CB node 105(3).

A single CB device may be designated as a master device that is responsible for controlling and managing the functional operation of the entire domain of devices in extended bridge 100 as a whole. In this example, CB node 105(2) is designated as the master CB node of extended bridge system 100. Master CB node 105(2) may be responsible for receiving network management commands from external network management applications (e.g., an SNMP manager, a command line interface (CLI) application, a web-based network management application, etc.) and applying and forwarding those management commands to internal devices (e.g., transit PE nodes 110(1)-(2) and edge PE nodes 115(1)-(5)).

As the master CB node, CB node 105(2) is also responsible for performing many other functions. For instance, master CB node 105(2) may run a variety of different protocols such as routing protocols (e.g., interior gateway protocol (IGP), border gateway protocol (BGP), etc.), multicast routing protocols (e.g., protocol-independent multicast sparse mode (PIM-SM) protocol, PIM source-specific multicast (PIM-SSM) protocol, bidirectional PIM (bidir-PIM), Internet group management protocol (IGMP), multicast listener discovery (MLD) protocol, etc.), network discovery protocols (e.g., link layer discover protocol (LLDP), etc.), layer-2 bridging protocols (e.g., rapid spanning tree protocol (RSTP), multiple spanning tree protocol (MSTP), etc.), and so on.

As another example, master CB node 105(2) may also be responsible for performing unicast routing table and forwarding table calculations, multicast forwarding table calculations, tunneled route/forwarding path calculations (e.g. IPv4-in-IPv4, IPv6-in-IPv4, IPv4-in-IPv6, generic routing encapsulation (GRE), virtual extensible local area network (VXLAN), etc.). As yet another example, master CB node 105(2) may further be responsible for performing traffic engineering; traffic policing; traffic shaping; bandwidth admission control; flow control; congestion control parameter maintenance and provisioning on the data-plane hardware forwarding engines; security, firewalling, and access control list (ACL) maintenance and data-plane provisioning; provisioning of routing/forwarding information on the data-plane hardware forwarding engines; running network management agent protocols (e.g. simple network management protocol version 3 (SNMPv3), running network configuration protocol (NETCONF), Web-Management, etc.); running security control protocols; running key distribution protocols; running an Ethernet link aggregation control protocol (LACP); running operations, administration, and management (OAM) protocols (e.g. bidirectional forwarding detection (BFD) protocol, etc.); running network monitoring agents (e.g., a Remote Monitoring (RMON) agent); and so on.

While FIG. 1 shows CB node 105(2) as the designated master CB node in this example, each of the CB nodes 105(1)-(3) may be configured to perform the operations described above by reference to master CB node 105(2). This way, any of the CB nodes 105(1)-(3) may serve as the master CB node of extended bridge system 100. For example, standby CB node 105(3) may switch to operate as the master CB node of extended bridge system 100 in the event that CB node 105(2) fails. As shown in FIG. 1, CB nodes 105(1)-(3) are connected in a closed ring network. In some embodiments, CB nodes 105(1)-(3) may be connected in a mesh topology where each CB node is connected to the other CB nodes.

Figure 2:
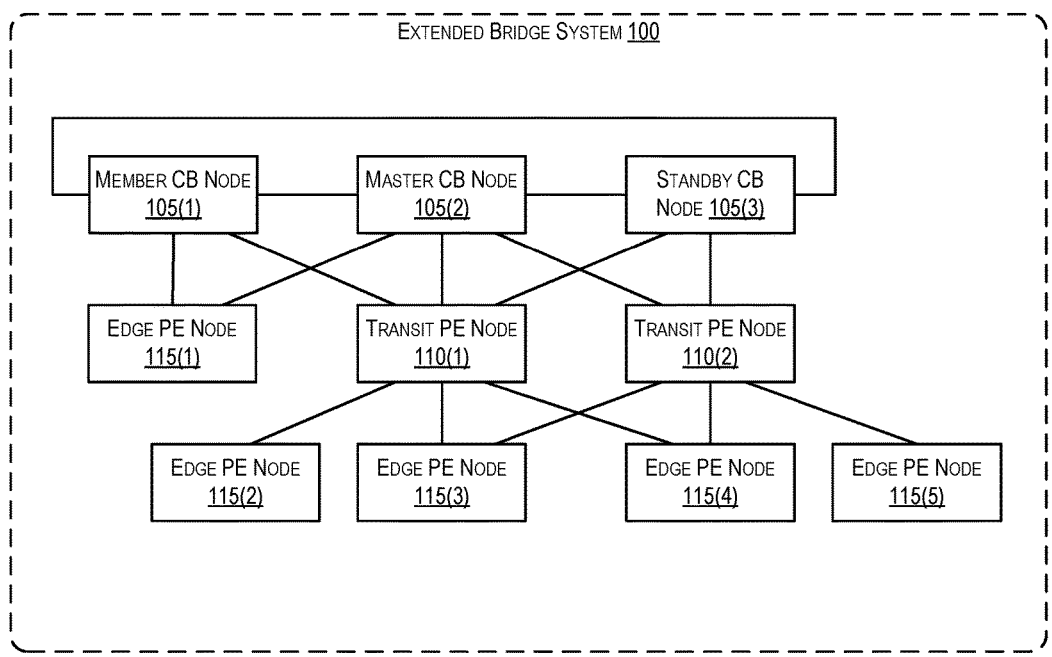
FIG. 2 depicts the topology of another example extended bridge according to an embodiment.

It should be appreciated that extended bridge 100 is illustrative and not intended to limit embodiments of the present disclosure. For example, although FIG. 1 depicts a particular number of CB nodes (3), transit PE nodes (2), and edge PE nodes (5), any number of CB nodes, transit PE nodes, and edge PE nodes may be supported. In addition, while FIG. 1 shows these network devices interconnected in a particular topology, the embodiments described herein may be applied to any type of network topology. For example, FIG. 2 depicts another possible topology for extended bridge 100 of FIG. 1 according to an embodiment. In the topology of FIG. 2, PE nodes are connected to multiple CB nodes (also referred to as dual-homing or multi-homing of PE nodes). For instance, transit PE node 110(1) is connected to CB nodes 105(1)-(3), edge PE node 115(1) is connected to CB nodes 105(1)-(2), transit PE node 110(2) is connected to CB nodes 105(2)-(3), and edge PE nodes 115(2)-(5) are connected to CB nodes 105(1)-(3) via transit PE nodes 110(1)-(2). In some embodiments, such a network topology may be utilized for high-availability reasons, path redundancy reasons (e.g., protection against CB failures), and more efficient load balancing of traffic between CB and PE nodes.

Figure 3:
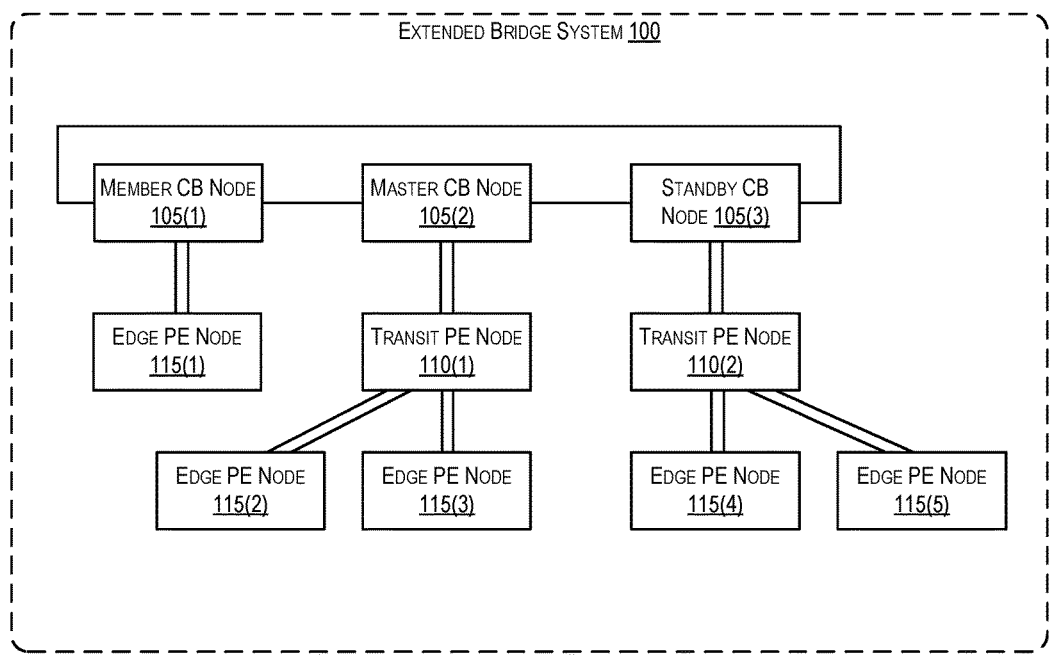
FIG. 3 depicts the topology of yet another example extended bridge according to an embodiment.

As another example, FIG. 3 depicts yet another possible topology for extended bridge 100 of FIG. 1. The topology shown in FIG. 3 is an alternative topology that provides high availability and/or resiliency against link or node failures between PE and CB nodes. Specifically, the topology illustrated in FIG. 3 shows edge PE nodes connected with transit PE nodes and/or CB nodes in the form of closed rings (i.e. circular paths). In particular, FIG. 3 shows a closed ring between CB node 105(1) and edge PE node 115(1); a closed ring between CB node 105(2), transit PE node 110(1), and edge PE node 115(2); a closed ring between CB node 105(2), transit PE node 110(1), and edge PE node 115(3); a closed ring between CB node 105(3), transit PE node 110(2), and edge PE node 115(4); and a closed ring between CB node 105(3), transit PE node 110(2), and edge PE node 115(5).

In a closed ring, traffic may be allowed to use only one portion or segment of the ring at a time (as opposed to the entire closed ring). A segment of a ring represents a portion of the closed circular ring. That is, the segment represents a semi-circular path that is an open chain and does not have a closed loop, thereby avoiding the possibility of a traffic loop. A closed ring may be comprised of two semi-circular segments (e.g., a segment-L and a segment-R) that when joined in parallel at both end points form a closed circular ring path. One segment (e.g., either segment-L or segment-R) can be activated to carry traffic between PE and CB nodes. When a link or node fails in the currently active side of the ring, the other semi-circular path of the ring can automatically open so that traffic from PE nodes to CB nodes continues to flow uninterrupted.

One of ordinary skill in the art will recognize other variations, modifications, and alternatives to the example topologies illustrated in FIGS. 1-3.

3. Extended Bridge Master CB Node Election

Figure 4:
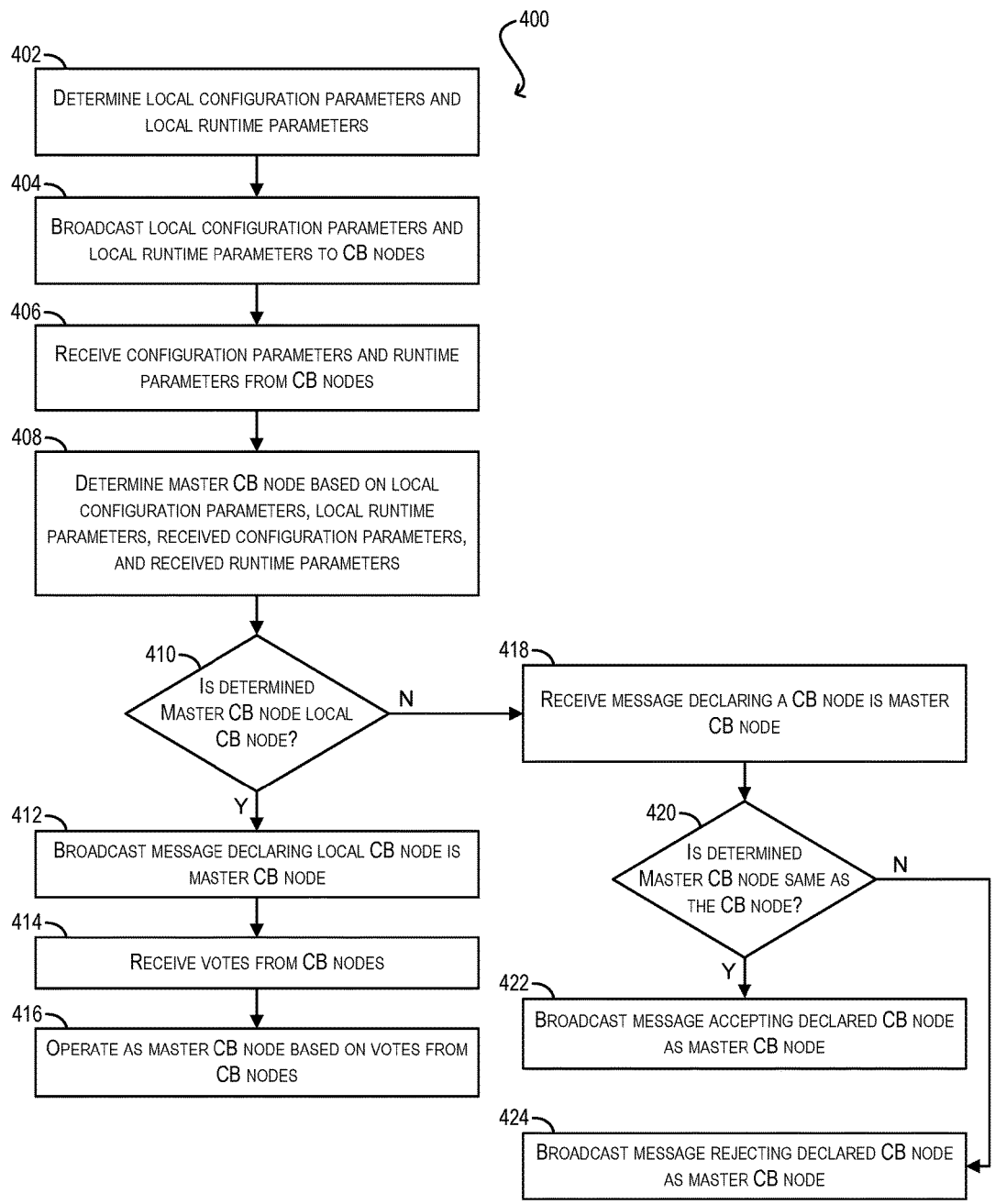
FIG. 4 depicts a flowchart for electing a master CB node in an extended bridge according to an embodiment.

As mentioned above, a single CB device may be designated as a master device in an extended bridge that is responsible for controlling and managing the functional operation of the entire domain of devices in the extended bridge. To facilitate this, the member devices of the extended bridge may participate in a topology discovery process (e.g., a hub-layer topology discovery process). A single CB node may then be elected as the master CB while the other CB nodes remain as member nodes. FIG. 4 depicts a flowchart 400 that can be performed by a CB node in an extended bridge (e.g., CB nodes 105(1)-(3) of FIG. 1) to elect a master CB node for the extended bridge according to an embodiment. In some embodiments, each CB node in the extended bridge can perform flowchart 400 as part of a discovery protocol operating on the CB node.

Starting with block 402, the CB node can determine location configuration parameters and local runtime parameters. In one set of embodiments, some of the local configuration parameters and/or local runtime parameters can be determined directly from the operation and/or configuration of the CB node itself. Other local configuration parameters and/or local runtime parameters can be parameters monitored by PE nodes (e.g., transit PE nodes and/or edge PE nodes) rooted under the CB node and are rolled up to the CB node. In this latter case, transit PE nodes can collect the parameters monitored by edge PE nodes underneath them. The transit PE nodes then send these edge PE node parameters, as well as the parameters monitored by the transit PE nodes themselves, to the CB node.

Examples of parameters that may be monitored by PE nodes may include congestion drops, traffic peak volume, and broadcast storms; firewall match or failure counters; volume of traffic sent to the software stack of the CPU for analysis; traffic generated and received by various control protocols (e.g., IGP/BGP routing protocols, multicast routing protocols, layer-2 control protocols at the root CB device, etc.); memory resource availabilities and resource depletion rates; link bandwidth availabilities; hardware forwarding engine resource availabilities, ACL rule processing engine (e.g., TCAM) resource availabilities; control plane processor capabilities, utilizations, failure rates, etc.; electrical energy utilization, electrical noise, thermal noise, and temperature gradients; and so on. In some embodiments, the aforementioned example parameters may also be parameters monitored by the CB node.

Examples of local configuration parameters determined by the CB node can include a number of links of the CB node, the type of links, a number of network interfaces of the CB node, and the speeds of the network interfaces, a priority of the CB node to be selected as master CB node, a health status check keep alive message exchange interval, a loss tolerance limit associated with the keep alive message exchanges, etc. Examples of local runtime parameters determined by the CB node may include measured network operational and status parameters regarding the runtime operation of the CB node such as an amount of traffic load of control protocols currently handled by the CB node, a number of internal links currently experiencing traffic congestion, a number of external network interfaces currently experiencing traffic congestion, etc.

Next, at block 404, the CB node can broadcast its local configuration parameters and local runtime parameters to the other CB nodes in the extended bridge. At block 406, the CB node can receive configuration parameters and runtime parameters from the other CB nodes in the extended bridge. The configuration parameters and runtime parameters received from a particular CB node are the local configuration parameters and the local runtime parameters of the particular CB node.

Then, at block 408, the CB node can determine a master CB node based on the local configuration parameters, the local runtime parameters, the received configuration parameters, and the received runtime parameters. In some embodiments, the CB node determines the CB node with the most number of the following criteria as the master CB node: the highest priority CB node, the CB node with highest number of links to PE nodes, the CB node with a minimum number of attached network interfaces, the CB node that is currently handling a minimum amount of traffic load of control protocols, and the CB node that has minimum number of internal links and external network interfaces currently experiencing traffic congestions. When there is a tie among multiple CB nodes in determining the master CB node, the CB node can break the tie by selecting the CB node with highest priority among the multiple CB nodes. When the several CB nodes have the highest node priority, the CB node can break the tie by selecting the CB node with the numerically higher node identifier (ID) value.

At block 410, the CB node can determine whether the determined master CB node is the local CB node (i.e. itself). If so, at block 412, the CB node can broadcast a message declaring that it is the master CB node. Next, at block 414, the CB node can receive votes from the other CB nodes in the extended bridge. A vote from another CB node in the extended bridge may be a vote to accept the CB node as the master CB node or a vote to reject the CB node as the master CB node. Then, at block 416, the CB node can operate as the master CB node based on the votes from the CB nodes. In some embodiments, the CB node operates as the master CB node if the percentage of the votes from the other CB nodes that are votes to accept the CB node as the master node is greater than or equal to a defined percentage (e.g., 50%, 60%, 75%, 100%, etc.). Otherwise, the CB node does not operate as the master CB node (e.g., the existing master CB node continues to operate as the master CB node). When the CB node starts operating as the master CB node, the CB node sends its identity information to all the PE devices under all PE trees rooted under all the CB nodes of the extended bridge system. In some embodiments, the CB node sends its identity information using an IEEE 802.1BR control and status protocol (CSP) discovery process.

If the CB node determines that the determined master CB node is not the local CB node (i.e. itself), at block 418, the CB node can receive a message from one of the other CB nodes declaring that the other CB node is the master CB node. Then, at block 420, the CB node can determine whether the determined master CB node is the same as the other CB node. If so, at block 422, the CB node can broadcast a message accepting the other CB node as the master CB node. Otherwise, at block 424, the CB node can broadcast a message rejecting the other CB node as the master CB node. In some embodiments, the message broadcasted at blocks 422 and 424 is a control message.

4. Extended Bridge Standby/Backup CB Node Election

After a CB node is elected as a master CB node and starts operating as the master CB node, the CB node can run a standby/backup CB election procedure to elect a CB node from the remaining CB nodes to be the standby/backup CB node for the extended bridge system. The standby/backup CB node transitions to operate as the master CB node after the current master CB node fails (e.g., the master CB node goes down, is rebooted, crashes etc.).

In some embodiments, the master CB node selects the standby/backup CB node based on capabilities of the remaining member CB nodes. For example, the master CB node can select a member CB node that has the same or similar capabilities as the master CB node to be the standby/backup CB node. In some embodiments, the master CB node selects the standby/backup CB node based on the distance of the remaining member CB nodes. For instance, the master CB node can select a member CB node that is adjacent (e.g., directly connected, within a defined number of hops, etc.) to the master CB node to be the standby/backup CB node. The master CB node can exchange keep alive health messages with such a standby/backup CB node faster thereby allowing the standby/backup CB node to receive updates regarding the health status and/or operational status of the master CB node faster because the distance between the master CB node and such a standby/backup CB node is one hop or a few hops (as opposed to the distance between a remote CB node and the master CB node, which are multiple hops away from each other).

When there are multiple member CB nodes in the extended bridge that are adjacent to the master CB node, the master CB node can select the standby/backup CB node based on network policy parameters (e.g., node priority, node ID, etc.). For example, the master CB node can select the member CB node with the highest node priority and/or the highest node ID. When certain extended bridge system parameters are enabled, such as minimum congested node, minimum congested attached links, minimum control protocol processing overhead etc., the master CB node can select an adjacent member CB node that best satisfies those applicable extended bridge system parameters. In some embodiments, the extended bridge may support a policy of N:1 CB redundancy (i.e. N standby/backup CB node(s) for a single master CB node. In some such embodiments, the master CB node runs the standby/backup CB election procedure N times.

Once the master CB node elects the standby/backup CB node(s), the master CB node sends the identity information of the elected standby/backup CB node(s) to all the PE devices under all PE trees rooted under all the CB nodes of the extended bridge. In some embodiments, the master CB node sends this identity information using a type-length-value (TLV) extension to an IEEE 802.1BR CSP discovery process.

5.1 Extended Bridge Master CB Node Failure Detection

The master CB node periodically exchanges health status updates in the form of keep alive messages with the standby/backup CB node and all other discovered member CB nodes in the extended bridge. Similarly, the standby/backup CB node periodically exchanges keep alive messages with the master CB node and all other member CB nodes of the extended bridge system. In some embodiments, the standby/backup CB node determines that the master CB node has failed when it does not receive keep alive messages from the master CB node for a predefined number of successive intervals, a predefined amount of time, or a combination thereof.

5.2 Extended Bridge Master CB Node Failover

The master CB node is responsible for synchronizing its static and dynamically learned protocol configurations with the standby/backup CB node. This way, when the master CB node fails, the standby/backup CB node becomes the new master CB node and continues controlling and managing the extended bridge without having to bring down the extended bridge functional operations.

Upon detection of the failure of the master CB node, the standby/backup CB node declares itself as new master CB node and starts operating as the master CB node. That is, the new master CB node starts performing all the functionalities explained above for which a master node is responsible. The new master CB node also sends its identity information to all the PE devices under all PE trees rooted under all the CB nodes of the extended bridge system. In some embodiments, the new master CB node sends its identity information using an IEEE 802.1BR control and status protocol (CSP) discovery process and health status keep alive exchanges with all the PE devices of extended bridge. When PE devices in the extended bridge detect a change of master CB node's identity via the keep alive exchanges, they stop communicating with the old master CB node and start communicating with the new master CB node.

5.3 Extended Bridge Master CB Node Switchover

If a newly elected master CB node is different from the current active master CB node, then a master CB node switchover process is executed. The currently active master CB node may become a member CB node or a standby/backup CB node. In some embodiments, the master CB node switchover process is executed in a make-before-break manner. That is, user services, control protocols, etc. are migrated or started at the newly elected master CB node first before such operations are stopped or removed from the old master CB node.

6.1 Master CB Node Election in Extended Bridge with Multi-Homed PE Devices

As explained above by reference to FIG. 2, PE nodes can be connected to multiple CB nodes in some network topologies of an extended bridge. The master CB node in such network topologies may have a global view of the entire extended bridge topology of the extended bridge. This allows the master CB node to identify the CB nodes that are roots of PE trees containing multi-homed PE nodes (i.e., PE nodes connected to multiple CB nodes).

The master CB node may be responsible for running various layer-2 and layer-3 control protocols, running security protocols, and facilitating the provisioning of firewall traffic classifiers and traffic engineering parameters in the PE devices of the extended bridge topology. Thus, the master CB node may have multiple redundant and/or alternate paths through the PE chains for better reachability of the edge PE nodes and faster convergence in the event that one or more intermediate transit PE nodes and/or or intermediate CB nodes fail.

In some embodiments, the extended bridge topology supports a plug-and-play model that allows for the addition of edge PE nodes to the extended bridge topology or the removal of edge PE nodes from the extended bridge topology. Such edge PE nodes can be connected to customer edge devices. The number of alternate paths from a member CB node to the edge PE nodes may change when an edge PE node is added to the extended bridge topology or when an edge PE node is removed from the extended bridge topology. A member CB node that provides multi-homing connections to multiple PE chains may be a better candidate to be a master CB node than another member CB node that provides multi-homing connections to fewer PE chains or does not provide any multi-homing connections. In some embodiments, the member CB node with the highest number of such alternate and/or redundant paths may be elected to be the master CB node. If a master CB node switchover is required, then the same or similar process described above in section 5.3 is performed. In other embodiments, this criteria (i.e., the member CB node with the highest number of such alternate and/or redundant paths) may be used for determining a master CB node in the election of a master CB node as described above by reference to block 408.

6.2 Standby/Backup CB Node Election in Extended Bridge with Multi-Homed PE Devices After a master CB node is selected based on the multi-homing PE path metric, the new master CB node may select a standby/backup CB node among the eligible member CB nodes that are adjacent to the new master CB node. When there are multiple such adjacent member CB nodes eligible to become the standby/backup CB node, the master CB node selects the member CB node with the highest number of alternate and/or redundant paths to be the standby/backup CB node.

If the selected standby/backup CB node is different than the current standby/backup CB node, then the selected member CB node is promoted to be the new standby/backup CB node and the old standby/backup CB node is demoted to a member CB node. In some embodiments, the standby/backup CB node switchover is performed in a graceful manner to ensure that existing services through the extended bridging topology are not affected.

In some instances, if the master CB node switchover and/or standby/backup CB node switchover are performed too often, the switchover process itself may incur significant overhead in starting, restarting, or moving one or more control functionalities from one member CB node to another member CB node. Thus, master CB node and/or standby/backup CB node switchovers can be scheduled for less frequent executions based on the extended bridge network policy in some embodiments. This way, the switchover process itself does not introduce excessive processing overhead on the CB nodes and does not delay or slow down other important control functions of the extended bridge nodes.

7.1 Master CB Node Election in Extended Bridge with Ring Protected PE Devices As explained above by reference to FIG. 3, edge PE nodes can be connected with transit PE nodes and/or CB nodes in the form of closed rings in some network topologies of an extended bridge. Such network topologies can provide faster recovery and convergence in the case of topology path failures due to links or nodes going down. Thus, a CB node that has ring topology-based connections with PE nodes has a higher chance of traffic flows between the CB node and the PE nodes surviving via failover and quicker convergence through the alternate semi-circular segment of the closed ring topology.

The current master CB node can have a global view of the entire extended bridge topology (e.g., via a CSP and LLDP-based discovery process). Accordingly, the master CB node can search through the currently known topology to find a better member CB node based on ring-based failover paths. A member CB node with a higher number of ring topology-based connections with PE nodes may be a better candidate to be a master CB node than another member CB node that has fewer ring topology-based connections with PE nodes or does not have any ring topology-based connections with PE nodes. In some embodiments, if the master CB node finds a member CB node that has a higher number of ring protected PE paths, the master CB node may promote that member CB node as a new master CB node and relinquish itself as the master CB node by announcing a master CB node change to the entire extended bridge network of interconnected CB devices and PE devices. In other embodiments, this criteria (i.e., the member CB node that has the highest number of ring protected PE paths) may be used for determining a master CB node in the election of a master CB node as described above by reference to block 408.

7.2 Standby/Backup CB Node Election in Extended Bridge with Ring Protected PE Devices In some embodiments, the selection of the standby/backup CB node can be based on the member CB node with the highest number of ring topology-based connections with PE nodes. In some such embodiments, the eligible member CB nodes from which to select the standby/backup CB node are comprised of member CB nodes that are adjacent (e.g., directly connected, within a defined number of hops, etc.) to the master CB node. This way, the standby/backup CB node can detect failure of the master CB node and take over as the new master CB node in the event the current master CB node fails. When the master CB node selects a standby/backup CB node, the master CB announces the identity and location of the new standby/backup CB node to the entire extended bridge network of interconnected CB devices and PE devices.

8. Other Criteria for Electing a Master CB Node

As explained above, a CB node performing flowchart 400 determines the CB node with the most number of certain criteria as the master CB node. One of ordinary skill in the art will understand that the criteria described above are merely examples. In some embodiments, additional and/or different criteria may be used in determining a master CB node. The following are examples of such criteria.

8.1 Transactional Latency in the Extended Bridge Fabric

In an extended bridge, a single CB device is responsible for network management configurations of all the PE devices in the same administrative domain. In the case of multi-rooted trees (i.e., a multi-rooted forest of PE devices) where each CB device represents the root node of its underlying tree of PE devices, a single CB device is assigned the role of a master CB device. The master CB device is responsible for network management of all the other member CB node(s).

The master CB device can receive network administrator or network operator initiated protocol configuration updates via a network management agent (SNMP, CLI, NETCONF, etc.). The master CB device can then provision or send such configuration parameter updates to the other member CB devices and PE devices in the extended bridge as configuration transactions. Depending on the distance (e.g., hop count) and the bandwidth of the links along the path to the member CB devices and PE devices, the latencies of configuration transactions to those member CB devices and PE devices may vary. If the master CB device is not optimally placed in the multi-rooted forest, then the PE devices that are farther from the master CB device may experience more latencies in receiving configuration transactions than other PE devices that are located closer to the master CB device. To balance or achieve uniform latencies in configuration transaction delivery among the PE devices, the master CB device may be placed in the PE forest such that the degree of asymmetry in transaction latencies is minimized.

For an extended bridge forest with N number of rooted trees $T_1, T_2, \ldots T_{N-1}, T_N$, assume that at any time there may be $M_1, M_2, \ldots M_{N-1}, M_N$ number of PE devices under the rooted trees, respectively. As mentioned above, leaf nodes are edge PE devices and interior nodes are transit PE devices. As such, edge PE devices may experience more transaction latencies than transit PE devices due to being at longer distances from the master CB node.

In addition, assume that a PE device $PE_{i,j}$ where $1<=i<=N$ and $1<=j<=M_i$, is located at a distance of hop count $H_{i,j}$ where $1<=i<=N$ and $1<=j<=M_i$. The transaction latency or cost $C_{i,j,k}$ of transaction message propagation over a link $L_{i,j,k}$ is inversely proportional to the link speed or the available bandwidth of that link. Thus, the transaction latency $TD_{i,j}$ to send a configuration transaction from a master CB device to a PE device $PE_{i,j}$ may be sum of the component latencies across the links along the path to the PE device as expressed in the following equation:

$$TD_{i,j} = \Sigma C_{i,j,k} \text{ for } 1<=k<=H_{i,j}$$

This may be an estimate of the latency since the links can be simultaneously used for internal transaction message propagation and other network traffic (e.g., the customer network traffic). For example, network traffic can enter via an ingress edge PE device, travel as E-tagged traffic through the extended bridge forest, be switched or routed at a CB device, and then travel over the internal links to an egress edge PE device to reach a destination device. Thus, the master CB device can measure the 2-way, end-to-end path latencies of transaction delivery and acknowledgements to/from the PE devices.

In some embodiments, the master CB device computes an exponential weighted moving average (EWMA) of these measured latency values for the paths to the PE devices. For instance, the master CB device may compute the EWMA following of the measured latencies using the following equation:

$$A(n) = \alpha*P(n) + (1-\alpha)*A(n-1)$$

where $A(n)$ represents the average estimate at the n-th iteration, $P(n)$ represents the measured latency value at the n-th iteration, and $0<\alpha<1$ is a fraction used as an average smoothing factor. The master CB device can maintain the averaged latency values in a latency matrix $DM_{i,j} = [dm_{i,j}]$, where $dm_{i,j}$ represents the measured latency of transaction delivery to the $PE_{i,j}$ (i.e., the j-th PE device in the i-th rooted tree of PE forest). In the latency matrix, each i-th row vector represents a latency vector of measured transaction latencies to PE devices under the i-th member CB device. Under normal traffic conditions the latency vector for the rooted tree directly under the master CB device may have the smallest numerical values and the latency vector for furthest rooted tree may have the largest numerical values.

From the latency matrix, the master CB device can determine a median row whose numerical values are approximately the mean of the numerically smallest row and largest row. The member CB device corresponding to the determined row in the latency matrix can have the potential to minimize the transaction latency asymmetries among the rooted trees of the PE forest. In some embodiments, this criteria (i.e., the CB node determined to minimize transaction latency asymmetries among rooted trees of a PE forest) may be used for determining a master CB node in the election of a master CB node as described above by reference to block 408.

8.2 Optimal Path Provisioning for Extended Bridge E-Tagged Services

Every CB device in the extended bridge topology can be a potential bridging or switching agent for a virtual local area network (VLAN)-tagged traffic flow (e.g., a VLAN-tagged customer traffic flow) from an ingress PE device to an egress PE device. While traversing through the interior of the extended bridge topology, the VLAN-tagged traffic may be further encapsulated via e-tagging upon entry at the ingress PE device and de-capsulated upon exist from the egress PE device.

In some embodiments, VLAN-based traffic can be virtual bridged at a single tree-root device (e.g., a CB device). Such traffic may traverse through the extended bridge topology in a path P1(i,j)=<E_PE(i), T_PE(i,t1)>, <T_PE(i,t1), T_PE(i,t2)>, <T_PE(i,t2), T_PE(i,t3)>, . . . <T_PE(i,tm), CB(m)>, . . . <CB(m), T_PE(j,tm)>, . . . <T_PE(j,t3), T_PE(j,t2)>, <T_PE(j,t2), T_PE(j,t1)>, <T_PE(j,t1), E_PE(j)>, where E_PE(i) is the ingress edge PE device, E_PE(j) is the egress edge PE device, and T_PE(i,tk) and T_PE(j,tk) are transit PE devices.

Figure 5:
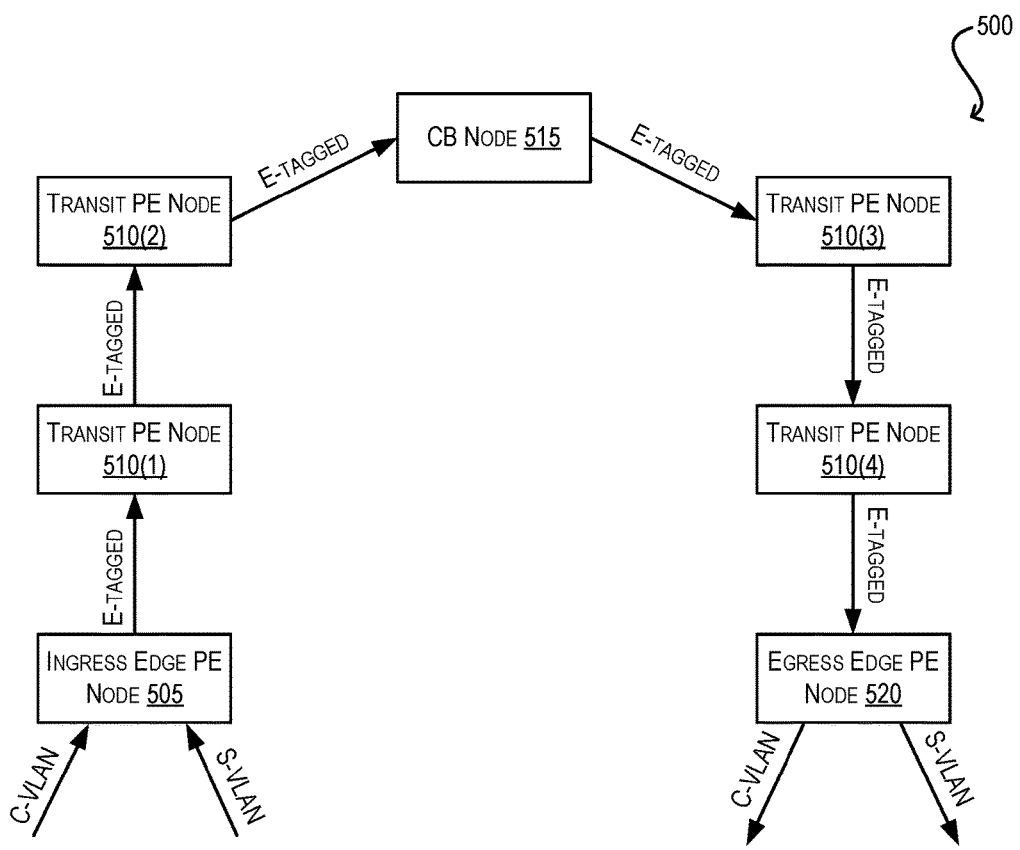
FIG. 5 depicts an example bridged path for an extended bridge according to an embodiment.

FIG. 5 depicts a path 500 bridged by a single CB device 505 according to an embodiment. As shown, path 500 includes ingress edge PE device 505, transit PE devices 510(1)-(4), CB device 515, and egress edge PE device 520. In path 500 of FIG. 5, VLAN-based traffic (e.g., customer VLAN (C-VLAN) traffic, service provider VLAN (S-VLAN) traffic, etc.) enters ingress edge PE device 505. Ingress edge PE device 505 encapsulates the traffic by appending an e-tag to the traffic. The traffic is then forwarded to egress edge PE device 520 through transit PE device 510(1), transit PE device 510(2), CB device 515, transit PE device 510(3), and transit PE device 510(4). Upon receiving the traffic, egress edge PE device 520 decapsulates the traffic by removing the e-tag from the traffic and then forwards the traffic to its intended destination.

In some embodiments, VLAN traffic can be virtual bridged by a cascaded chain of multiple physical CB devices (also referred to collectively as a logical CB device). For a logical CB device CB(M) comprised of CB(m1), CB(m2), CB(m3), . . . CB(mn) physical CB devices, such VLAN traffic can be virtual bridged through the extended bridge topology in a path P2(i,j)=<E_PE(i), T_PE(i,t1)>, <T_PE(i,t1), T_PE(i,t2)>, <T_PE(i,t2), T_PE(i,t3)>, . . . <T_PE(i,tm), CB(m1)>, <CB(m1), CB(m2)>, <CB(m2), CB(m3)>, . . . <CB(mn), T_PE(j,tm)>, . . . <T_PE(j,t3), T_PE(j,t2)>, <T_PE(j,t2), T_PE(j,t1)>, <T_PE(j,t1), E_PE(j)>, where E_PE(i) is the ingress edge PE device, E_PE(j) is the egress edge PE device, and T_PE(i,tk), T_PE(j,tk) are transit PE devices.

Figure 6:
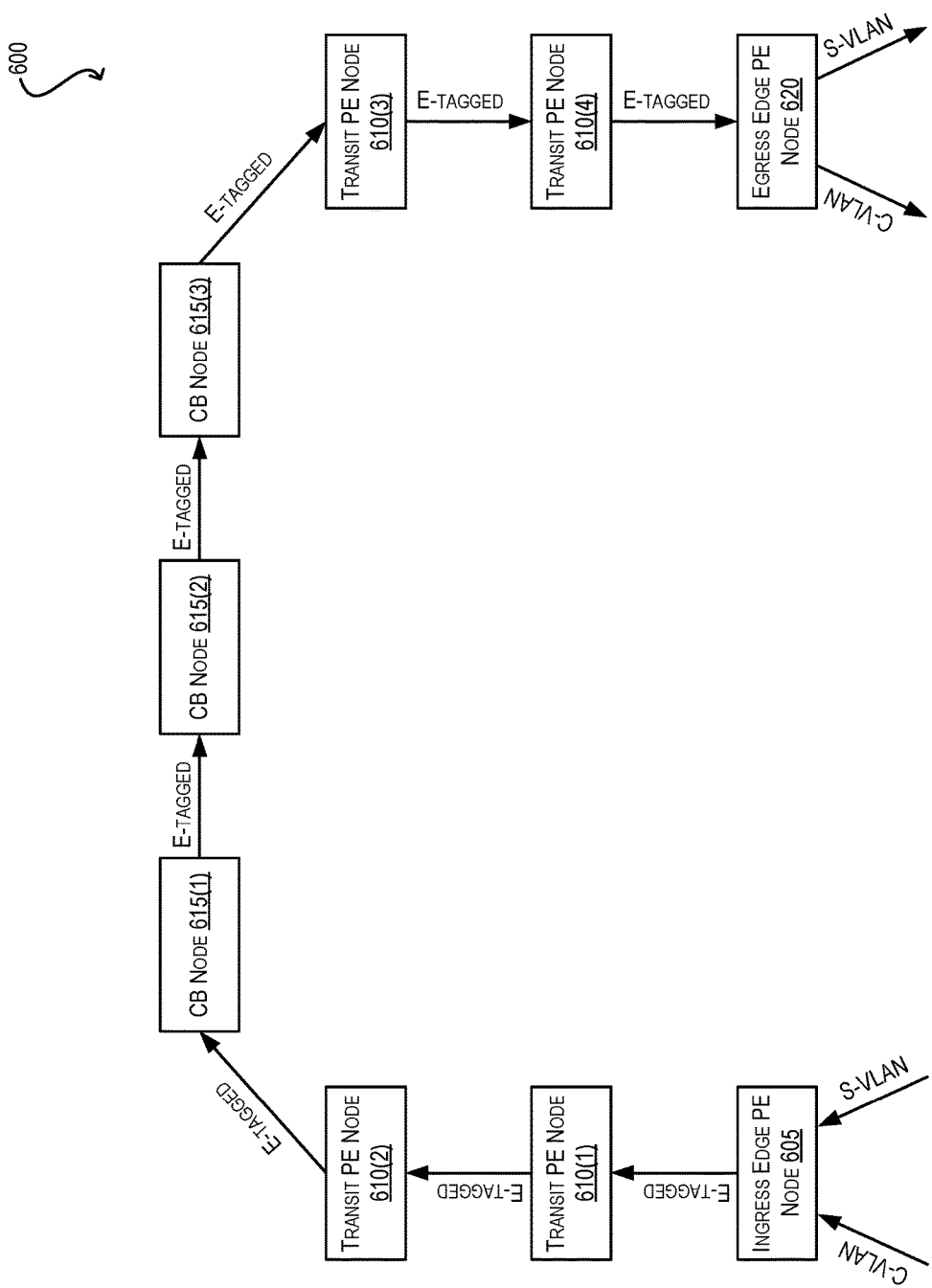
FIG. 6 depicts another example bridged path for an extended bridge according to an embodiment.

FIG. 6 depicts a path 600 bridged by multiple CB devices according to an embodiment. As illustrated, path 600 includes ingress edge PE device 605, transit PE devices 610(1)-(4), physical CB devices 615(1)-(3), and egress edge PE device 620. In path 600 of FIG. 65, VLAN-based traffic (e.g., customer VLAN (C-VLAN) traffic, service provider VLAN (S-VLAN) traffic, etc.) enters ingress edge PE device 605. Ingress edge PE device 605 encapsulates the traffic by appending an e-tag to the traffic. The traffic is then forwarded to egress edge PE device 620 through transit PE device 610(1), transit PE device 610(2), CB devices 615(1)-(3), transit PE device 610(3), and transit PE device 610(4). Upon receiving the traffic, egress edge PE device 620 decapsulates the traffic by removing the e-tag from the traffic and then forwards the traffic to its intended destination.

8.3 Optimal Path Calculation for Extended Bridge E-Tagged Services

As mentioned above, in an extended bridge, a single CB device is responsible for network management configurations of all the PE devices in the extended bridge. A master CB device can be selected based on optimal path performance parameters of the paths from the CB device to all the reachable PE devices. In some embodiments, a path performance is optimal when internal control communications used for various configuration parameter provisioning by the master CB device to PE devices and the collection of statistics from the PE devices are optimal with respect to latency, packet loss ratio, congestion loss, etc.

Each member CB device can periodically run the path performance calculation procedures using an extension of the ITU-T Y.1731 standard-based performance measurement procedures of Ethernet links. The measured values are averaged using the EWMA equation mentioned above where P(n) represents the measured parameters. The averaged parameters are reported to the master CB device. The master CB device can maintain such received averaged values of CB-to-PE path performance metric values.

Based on the network policy of the extended bridge topology, the master CB device can periodically run an optimal CB-to-PE path finding computation at policy-defined frequencies. In some embodiments, the optimal CB-to-PE path finding computation are modeled as a constrained shortest path finding problem. Examples of path finding computation techniques used in some such embodiments include the following:

A*Prune: An Algorithm for finding K Shortest Paths subject to Multiple Constraints—IEEE INFOCOM 2001.

Finding K Shortest Paths—David Eppstein—SIAM Journal on Computing, Volume 28 Issue 2, Apr. 1999.

DHPA* and SHPA*: Efficient Hierarchical Game Worlds—Proceedings of the Sixth AAAI Conference on Artificial Intelligence and Interactive Digital Entertainment.

In some embodiments, the measured values of CB-to-PE path latency (2-way delay), packet loss ratio, congestion drop statistics, etc. can be used as path constraints in the optimal path calculations.

8.4 Latency and Jitter Monitoring of the Extended Bridge Fabric

In some embodiments, extensions to performance monitoring features of various standard OAM protocols (e.g., an International Telecommunication Union Telecommunication Standardization Sector (ITU-T) Y.1731 standard-based Connectivity and Fault Management (CFM) protocol) can be used to measure the path latency and jitter between CB devices and PE devices. The ITU-T Y.1731 standard define methods for measuring performance parameters that include a single-ended synthetic frame loss measurement, a double-ended synthetic frame loss measurements, a measurements of frame delay, an inter-frame delay variation, etc. These methods can be performed by the data-plane application-specific integrated circuit (ASIC)-based forwarding engines. In some embodiments, these methods are implemented by the CPUs of CB and PE devices in the extended bridge.

Each of the member CB devices can periodically measure such parameters by running the extended version of the performance monitoring protocols of the ITU-T Y.1731 standard. The member CB devices can run such measurement procedures across each PE chain from the member CB device to the transit PE devices and/or the edge PE devices. For each of the PE devices, the member CB devices can maintain the measured parameters (e.g. 2-way path delay, frame loss ratio, etc.) and maintain averages of the parameters. Such path characteristic parameters can be used as path constraints during optimal path calculations from CB to PE devices (e.g., the optimal path calculations described above in Section 8.3).

8.5 Energy Utilization and Energy Efficiency in the Extended Bridge Fabric

The extended bridge with a multi-rooted forest topology can scale via a plug-and-play model that allows for the addition of a large number of PE devices (e.g., in campus networks, in data centers, etc.). The extended bridge can facilitate traffic from a variety of services (e.g., Internet web search, web-mail, online messaging, online gaming, scientific computing, high performance cluster computing, financial stock transactions, cloud-based online health management services, etc.). In order to facilitate traffic from such services, the extended bridge may be a high performance extended bridge that provides guaranteed delivery and low latency services.

Each extended bridge may include a large number of heterogeneous components for computing and storage as well as a networking infrastructure to distribute power and provide cooling. In addition, each extended bridge can be viewed externally as a black box that responds to a large number of traffic flows from applications (e.g., end customer applications) running in virtual-machine-based hosts in data centers or edge devices (e.g., customer edge devices) in campus networks. Each extended bridge may consume a significant amount of electrical power and produce waste heat. As the demand of traffic (e.g., customer traffic) increases and the extended bridge expands by adding more and more PE devices at the edge to meet the growing number of tenants (e.g., end customers) at data centers and campus networks, power consumption in the extended bridge also increases. In order to facilitate green energy computing in the extended bridge-based networking services, energy can be saved in various ways. For instance, energy-efficient hardware components (e.g., energy efficient host processors in routing/switching nodes of the extended bridge), smart resource management, and smart distributed software architecture of the extended bridge may be employed to save energy.

Multi-core GPU technology-based host processors may be used in the control plane of routing/switch devices. In some embodiments, an energy efficiency feature is included in such a hardware platform. Accordingly, energy is saved in extended bridges by using smarter resource management techniques and smarter distributed software architecture techniques. Dynamic provisioning, load distribution, and shutting down under-utilized PE-trees under CB devices during off-peak intervals may provide significant power savings in some embodiments.

8.6 Ethernet Bridging Topology Discovery Layer-2 Control Protocol Overhead

In a layer-2 virtual local area network (VLAN) bridged network, network bridges exchange bridge protocol data unit (BPDU) packets according to bridging control protocols (e.g., RSTP, MSTP, etc.). The BPDU control packets are exchanged through the data ports of member CB devices and PE devices of an extended bridge system. When large number of VLANs are configured, the BPDU processing overhead on the host central processing unit (CPU) of the master CB device may be very high. In addition, if the master CB node is located far away from the majority of the bridging control protocol enabled data ports, then BPDU propagation latency and bandwidth consumption over the interior links of the extended bridge system may be very high, resulting in less efficient operations and slow convergence of the bridging control protocol. This may also impact the overall performance and throughput of the extended bridge as a whole.

The BPDU processing overhead may be a function of the various different parameters. Examples of such parameters include a number of RSTP enabled VLAN(s) configured on certain network interfacing data ports (e.g., the customer network interfacing data ports) of the extended bridge, availability of computational power of the host CPU, propagation latencies of the interior links of the extended bridge connecting the master CB device to other member CB devices and the PE devices in the extended bridge, bandwidth utilizations of interior links of the extended bridge (which can be measured by polling traffic statistics for the links from the data plane forwarding engine of destination devices that are connected to those links), etc.

In some embodiments, each of the CB devices present in the extended bridge periodically measures the parameters and calculates average values using the EWMA equation mentioned above where P(n) represents the measured parameters. The member CB device(s) and standby/backup CB device(s) also periodically send the master CB device such averaged parameter estimate values as loads of layer-2 control protocols. The master CB device maintains (e.g., in the memory of the master CB device) the load estimate values received from each CB device of the extended bridge system in a load database table. In some embodiments, these load estimates may be criteria used for determining a master CB node in the election of a master CB node as described above by reference to block 408. For example, the CB node with the lowest overhead may be a criteria used for determining the master CB node.

8.7 Virtual Bridging Topology Discovery Layer-2 Control Protocol Overhead

An extended bridge can include a group of Ethernet bridging devices that are configured to run an IEEE 802.1BR CSP protocol. Such a CSP protocol works in collaboration with an LLDP discovery protocol and is responsible for discovering the CB devices and PE devices in the system. A discovery procedure runs when a new CB or PE devices is powered on for the first time as well as when such devices are restarted (e.g., due to software crash, network management action, components failures, etc.).

In a centralized discovery architecture, the master CB device can be responsible for the discovery and status monitoring of all the PE devices under all rooted trees of the extended bridge. The CSP-based discovery and monitoring process involves the master CB device exchanging periodic control messages with all other PE devices in the extended bridge. As a result, the master CB device may be the scaling and performance bottleneck for PE device multiplication (e.g., port density expansion of the extended bridge according to the IEEE 802.1BR standard). Thus, the master CB device can be located among the rooted member CB devices such that the overall distances travelled by the CSP control messages between the master CB device and the PE devices under every rooted tree are minimized and the latencies are not skewed. If a rooted tree is too far away from the master CB device, then the periodic CSP control messages may travel much longer distances and incur longer latencies resulting in timeout and PE neighbors being disconnected, which may not occur for PE devices of rooted tree that are closer to the master CB device.

In some embodiments, the master CB device uses a TLV extension in the CSP messages to carry time-stamp values in order to facilitate 2-way latency calculations. In some such embodiments, these measured 2-way latency values represent the CB to PE path latencies. The master CB device can maintain those measured CSP latencies for all the reachable PE devices in a latency matrix. In some embodiments, the master CB device implements the latency matrix in the same or similar manner as the latency matrix described above for transactional latencies. The master CB device can periodically or on pre-defined intervals run a median finding procedure against the latency matrix to determine a member CB with a location that improves/optimizes the latencies. In some embodiments, this criteria (i.e., the CB node with a location that improves/optimizes the latencies) may be used for determining a master CB node in the election of a master CB node as described above by reference to block 408. If the median finding procedure does not find a member CB device with a location that improves/optimizes the latencies, then the current global master CB device continues operating as the global master CB device in some embodiments.

In a distributed discovery architecture, every CB device that represents the root of its underlying PE tree can run the CSP discovery process to discover its underlying PE devices. Every CB device also calculates measurements of latencies to each of the PE devices in its underlying PE tree. In such a distributed discovery architecture, the CB device that represents the root of its underlying PE tree is the optimal CB device for PE devices in the underlying PE tree because the CB device is the closest tree root node for the PE devices. Therefore, each CB device is the local master CB device for its underlying PE tree.

A global master CB device for the extended bridge can be selected in a variety of different ways. For example, the CB device with the most number of underlying PE devices may be selected as the global master CB device. Since the majority of the PE devices are under the PE tree of such a CB device, most layer-2/layer-3 protocol traffic travels over the links in the PE tree in order to reach the global master CB device (as opposed to traveling over links between CB devices). Layer-2/layer-3 protocol traffic from PE devices from other rooted PE trees (i.e., PE devices not under the PE tree of the global master CB device) travel through the links between CB devices in order to reach the global master CB device. In some embodiments, the CB device with the most number of underlying PE devices may be criteria used for determining a master CB node in the election of a master CB node as described above by reference to block 408.

In the above example, the host CPU of the global master CB device may become congested due to handling control traffic from many PE devices. Thus, as another example, the CB device with the most number of high bandwidth links to reach underlying PE devices of its underlying rooted PE tree may be selected as the global master CB device. Such a global master CB device allows control protocol messages entering/exiting via the majority of PE devices to reach and leave the global master CB device faster. While control protocol messages from PE devices under other CB devices may traverse longer distances via the links between CB devices in order to reach the global master CB device, it may add minimal overhead. In some embodiments, the CB device with the most number of high bandwidth links to reach underlying PE devices of its underlying rooted PE tree may be a criteria used for determining a master CB node in the election of a master CB node as described above by reference to block 408.

8.8 Layer-3 Control Protocol Processing Overhead in the Extended Bridge Fabric

Layer-3 control protocol processing overhead can be based on a variety of protocols. For example, layer-3 control protocol processing overhead may be based on IGP protocols (e.g., open shortest path first (OSPF)), BGP, and multicast routing protocols (e.g., PIM-SM, PIM-SSM, bidir-PIM, IGMPv3, MLDv2, virtual router redundancy protocol version 3 (VRRPv3), etc.). In some embodiments, this criteria (e.g., layer-3 control protocol processing overhead) may be used for determining a master CB node in the election of a master CB node as described above by reference to block 408.

8.9 Routing Protocol Overhead Constrained Master CB Node Election

Layer-3 routing protocols can consume a significant amount of CPU processing power due to routing shortest path calculations and multicast replication cache table computations. Further, such routing protocols may consume a large amount of I/O bandwidth of internal links of the extended bridge for periodic reception and propagation of routing control protocol traffic to/from external routing neighbors. In some embodiments, the routing table computational CPU power usage and routing control message exchange bandwidth overhead can be based on a number of parameters. Examples of such parameters include a number of IGP and BGP routing neighbors, a number of routes to be supported in the routing table, a number of multicast group addresses to be supported, and a number of IPv4 and/or IPv6 address capable layer-3 interfaces to be supported in the entire extended bridge.

In a centralized routing architecture, the master CB device runs all the layer-3 routing protocols (e.g., IGP, BGP, and multicast routing protocols) and hence the master CB device incurs such processing overhead. In a distributed routing architecture, each member CB device runs the layer-3 routing protocols and incurs its own respective routing processing overhead. In an M+N redundancy architecture that has M number of redundant master CB devices and N number of redundant standby/backup CB devices where M>=1 and N>=1, M number of master CB devices run the layer-3 routing protocols.

Individual member CB devices can periodically measure their CPU power usage and I/O bandwidth usage and express those measurements as normalized smoothed average load values using an Auto-Regressive Moving Average (ARMA) model defined using the EWMA equation mentioned above where P(n) represents the measured parameters. Based on the policy of the extended bridge, the member CB devices periodically send the normalized smoothed averaged load reports to the master CB device. When there are multiple master CB devices, the member CB devices can broadcast the load reports to all of the master CB devices.

Different routing protocol overhead may depend on different factors. For example, the IGP routing protocol processing overhead can depend on a number of IPv4 or IPv6 interfaces that are enabled for OSPF routing, a number of OSPFv2 and OSPFv3 specific routes to be supported by the extended bridge, a number of OSPF areas to be supported by the extended bridge, and a number of OSPF inter-area routes to be supported by the extended bridge. For the BGP routing protocol, the processing overhead may depend on a number of BGP routing peers to be supported by the extended bridge, a number of BGP prefixes to be supported by the extended bridge, a number of BGP incoming and outgoing routing policies to be supported by the extended bridge, and a number of BGP intra-autonomous system (intra-AS) and inter-AS routes to be supported by the extended bridge. The multicast routing protocol processing overhead can depend on a number of PIM-SM and PIM-SSM routing neighbors to be supported, a number of IPv4 and IPv6 multicast group addresses to be supported by the extended bridge, and a number of IGMPv3 and MLDv3 multicast groups in the form <S,G,V> to be supported by the extended bridge where S represents a multicast source, G represent a multicast group address, and V represents a VLAN identifier (ID).

The master CB devices can maintain the received load reports in a load matrix. In some embodiments, the master CB devices can consolidate the layer-3 routing control protocol overhead (i.e. the measured routing load) across the routing protocols (e.g., IGP, BGP, and multicast routing protocols) into a single load metric. Based on a pre-defined policy of the extended bridge, the master CB devices may periodically search through the load matrix to identify minimally loaded member CB devices. When the master CB device finds a lower loaded member CB device, the master CB device can choose to promote that member CB device as a new master CB device (e.g., using the switchover mechanism described above) without impacting any of the existing layer-2, layer-3 or multicast services that are currently transported by the extended bridge. In some embodiments, the load of member CB devices may be a criteria used for determining a master CB node in the election of a master CB node as described above by reference to block 408.

During the initial phase of operation of the extended bridge, the master CB device may not calculate any load metrics and/or the master CB device may not receive any load reports. In such a phase, each member CB device can be eligible to be a master CB device. In some embodiments, the network policy of the extended bridge specifies that the member CB device with the highest priority is to be the master CB device.

8.10 Routing Protocol Overhead Constrained Backup CB Node Election

When a new master CB device is elected, the existing standby/backup CB device may no longer remain as a standby/backup CB device. For example, the existing standby/backup CB device may not be adjacent (e.g., directly connected, within a defined number of hops, etc.) to the new master CB device. Thus, the new master CB device may run a standby/backup CB election process and choose a standby/backup CB device from among the eligible member CB devices (e.g., adjacent member CB devices).

8.11 OAM Protocol Processing Overhead in the Extended Bridge Fabric

An extended bridge may run several different OAM protocols for the maintenance and recovery of services (e.g., VLAN services, IP Routed services, etc.) at various layers (e.g. a link layer). Examples of such OAM protocols include an Ethernet Link OAM, an IEEE 802.1ag standard-based CFM, and an Internet Engineering Task Force (IETF) Standard Bi-Directional Fault Detection Protocol (e.g., based on IETF RFC5880, RFC5881, RFC5882, RFC5883, RFC5884, RFC7130, etc.). To support high scaling and performance capabilities, the OAM protocols can be run in a distributed architecture. In such an architecture, periodic monitoring and fault detection mechanisms are run close to the actual traffic transmit and receive paths (i.e. on data-plane hardware and software of each member CB device).

The number of OAM protocol sessions that run on each member CB device may vary depending on the number of physical, logical links, and/or next-hop IP adjacencies to be fault monitored and/or connection verified. As such, different member CB devices may incur different amounts of OAM protocol processing overhead (also referred to as OAM processing load). When the number of OAM protocol sessions change on an individual member CB device (e.g., due to new sessions being added, existing sessions being disabled, and/or existing sessions going down, due to remote OAM monitoring peers going down or being disabled, etc.), the OAM processing load also changes on the local member CB device. In some embodiments, the individual member CB devices express their OAM processing load as normalized factors of a percentage of CPU processing power utilized and a percentage of I/O bandwidth utilized. The member CB devices may run a smooth averaging algorithm on the measured load values based on an ARMA mechanism. The member CB devices can send those normalized and smoothed average load measurement values as a load report to the master CB device in the extended bridge.

The master CB device may maintain the load reports received from various member CB devices. Based on network policy of the extended bridge, the master CB device can run a minimal loaded member CB device selection process to determine a member CB device that has a lower OAM processing load than the current master CB device. If the master CB device finds such a member CB device, the master CB device can promote that member CB device to be the new master CB device. In such a case, a master CB device switchover procedure is executed in a graceful manner so that none of the existing services supported by the extended bridge are impacted.

8.12 Security Control Protocol Processing Overhead in the Extended Bridge Fabric The security control protocol processing overhead can be based on different control protocols. Examples of such control protocols include layer-2 security control protocols (e.g., an Ethernet port-based authentication protocol), Internet key distribution protocols (e.g., an Internet key exchange version (IKEv2) protocol), authentication protocols (e.g. a remote authentication dial-in user service (RADIUS) protocol, a terminal access controller access-control system (TACACS) protocol, a TACACS plus (TACACS+) protocol, etc.), firewall or access control list management and provisioning protocols, and firewall or access control list rules matching counter fetching and maintenance protocols. In some embodiments, the security control protocol processing overhead may be criteria used for determining a master CB node in the election of a master CB node as described above by reference to block 408.

8.13 Layer-3 Security Control Protocol Processing Overhead

The master CB device can be responsible for Internet Protocol (IP)-security control processing. For example, the master CB device can run various IP-security key distribution protocols and message digest computations (i.e., hash computations). IP-security control processing may be highly CPU-intensive. Further, IP-security key processing may be slower and thus increase the chances of security vulnerabilities if host CPU(s) are insufficient or have slow processing power. As such, the master CB device can be selected among the member CB devices based on the availability of sufficient host CPU processing capabilities and/or multi-core host processor availability. In some embodiments, the availability of sufficient host CPU processing capabilities and/or multi-core host processor availability of CB nodes may be criteria used for determining a master CB node in the election of a master CB node as described above by reference to block 408.

8.14 Packet Classifier Rules Provisioning Overhead in the Extended Bridge Fabric An access control list (ACL) can be used in routing/switching or bridging devices to selectively permit or deny traffic that matches one or more regular expression patterns in packet header data. The ACL has widespread usage including but not limited to traffic classification, traffic statistics, traffic metering/policing, traffic priority remarking, policy-based routing, traffic mirroring, traffic filtering, etc. The master CB device stores all the ACL related configurations and also facilitates the provisioning of those ACL rules in the data plane packet forwarding engine of devices in the extended bridge system. In some embodiments, the master CB device utilizes an internal configuration distribution infrastructure services to send the ACL rules provisioning requests to destination CB or PE devices in the extended bridge system.

In the extended bridge system, each device (e.g., CB devices and PE devices) has a TCAM processor in its local hardware data plane forwarding engine. ACLs are usually implemented in the switching data plane via the TCAM processor of devices, which usually consume a significant amount of power. Each member CB device and PE device can notify the master CB device, as part of a topology discovery extension, the capabilities of the TCAM processor of the device (e.g., a number of ACL rules the device can support). When the master CB device sends ACL programming requests to member CB devices and PE devices, the free space of the TCAM processors on such devices are utilized to program the new ACL rules. In response to such requests, each of the member CB devices and PE devices then notifies the master CB device of its respective remaining available free space of the TCAM processor. This way, the master CB device can maintain a global snapshot view of available capacities of the TCAM processors of the member CB devices and PE devices in the extended bridge system. Based on the global snapshot view of available TCAM processor capabilities of the CB devices and PE devices in the extended bridge system, the master CB device determines whether to accept or reject ACL service provisioning requests from network management administrators or internally from other routing/switching applications in the extended bridge system.

Since the master CB device forwards ACL provisioning requests to the CB devices and PE devices and also receives updates regarding the available capabilities of TCAM processors from the CB devices and PE devices, the master CB device may handle a significant amount of message processing overhead and/or CPU computational power usage overhead.

In a distributed ACL provisioning architecture, the individual member CB devices and PE devices can locally manage the allocation and deallocation of the available space of their local TCAM processor. In some embodiments, the ACL rules provisioning overhead is proportional to the number of ACL rules configured by the network management system. The ACL rules provisioning overhead can be measured by the total number and sizes of the control messages that the master CB device sends to the member CB devices and PE devices as provisioning/de-provisioning commands. Each member CB device may periodically measure such overhead using the EWMA equation mentioned above where P(n) represents the measured overhead. Such averaged values may be referred to as an ACL load metric parameter.

The master CB device can receive such ACL load metric values from the member CB devices and use those values to identify a minimally loaded member CB device. If the master CB device finds a member CB device with a lower ACL load metric than the master CB device, the master CB device may promote that member CB device to be the new master CB device. When the new master CB device is elected, the new master CB device can elect a member CB device among eligible member CB devices (e.g., adjacent member CB devices) to be the new standby/backup CB device. In some embodiments, the ACL load metric may be a criteria used for determining a master CB node in the election of a master CB node as described above by reference to block 408.

8.15 DOS Attack Protocol Processing Overhead in the Extended Bridge Fabric

For scaling and performance reasons, the extended bridge topology may provide a distributed architecture for denial of service (DOS) attack detection in some embodiments. The PE devices, which can have relatively less processing capabilities, may perform an initial investigation of DOS attacks based on various configured traffic metering thresholds. Upon an initial indication of a DOS attack, the PE devices send the received traffic rate to the parent CB devices of the PE tree for further analysis and command instruction about whether or not to block the traffic stream. As a result, each CB device can incur a processing overhead for the DOS attack detection in the extended bridge topology. This processing overhead may be proportional to the number of traffic flows supported on each PE device and the number of edge PE devices in the rooted PE tree underneath the CB device.

Each CB device can periodically measure the DOS attack processing overhead, average the measured values using the EWMA equation above where P(n) represents the measured overhead, and express the calculated average as a DOS attack load metric. The CB devices can report the DOS attack load metric to the master CB device. Once the master CB device receives the DOS attack load metric values, the master CB device uses those values to identify a minimally loaded member CB device. If the master CB device finds a member CB device with a lower DOS attack load metric than the master CB device, the master CB device may promote that member CB device to be the new master CB device. When the new master CB device is elected, the new master CB device can elect a member CB device among eligible member CB devices (e.g., adjacent member CB devices) to be the new standby/backup CB device. In some embodiments, the DOS attack load metric may be a criteria used for determining a master CB node in the election of a master CB node as described above by reference to block 408.

8.16 ACL Accounting or Traffic Statistics Collection Processing Overhead in the Extended Bridge Fabric Each CB device and PE device in the extended bridge may run traffic statistics collection functionalities. The CB devices and PE devices can collect the statistics parameters by reading the parameters from their respective hardware forwarding engines and then send the statistics parameters to the master CB device. The master CB device may aggregate the statistics parameters for further consumption by network management queries from CLI users, SNMP managers, web-Management, etc. As such, the master CB device incurs a statistics processing overhead that can be proportional to the number of member CB devices, the number of PE devices, and the total number of physical or logical ports in the extended bridge from which the statistics are collected.

The master CB device may periodically calculate the statistics processing overhead of the member CB devices in terms of the number of control messages exchanged with the remote PE devices and member CB devices and the size of such control messages. The master CB device may calculate an average of the statistics processing overhead (also referred to as the load metric value) using the EWMA equation mentioned above where P(n) represents the calculated overhead. The master CB device can use those values to identify a minimally loaded member CB device. If the master CB device finds a member CB device with a lower load metric than the master CB device, the master CB device may promote that member CB device to be the new master CB device. When the new master CB device is elected, the new master CB device can elect a member CB device among eligible member CB devices (e.g., adjacent member CB devices) to be the new standby/backup CB device. In some embodiments, the traffic statistics processing load metric may be a criteria used for determining a master CB node in the election of a master CB node as described above by reference to block 408.

8.17 SNMP/NETCONF Agent Protocol Processing Overhead

As described above, the master CB device may be responsible for running network management agent protocols. In some embodiments, the master CB device can run an SNMP agent that receives Get/Set/Get-Next operation requests from external SNMP management applications. In response to such requests, the master CB device then translates the requests into internal configuration management actions across various protocol and/or infrastructure components inside the member CB devices and PE devices of the extended bridge. Finally, the master CB device replies to the external management application. Thus, the master CB device incurs additional overhead in SNMP management information base (MIB) request processing.

In a distributed SNMP agent (e.g., using an SNMP AgentX protocol) implementation, sub-agents run on member CB devices and/or PE devices in the extended bridge while a master SNMP agent runs on the master CB device. In such an implementation, the master SNMP agent that runs on master CB device coordinates and collect responses from the sub-agents running on different remote devices (e.g., member CB devices and/or PE devices). Hence, the master CB device may need additional processing power and link bandwidth to handle the SNMP MIB network management processing overhead. In some embodiments, the processing power and link bandwidth to handle the SNMP MIB network management processing overhead of CB nodes may be criteria used for determining a master CB node in the election of a master CB node as described above by reference to block 408.

8.18 RMON Management Protocol Processing Overhead

As mentioned above, the master CB device can run network monitoring agents. For example, the master CB device may run an RMON agent that usually monitors various protocol statistics and chassis platform or infrastructure operational statistics in an extended bridge. In a centralized implementation, the master CB device runs an RMON agent that periodically polls and collects statistics from all the member CB devices and PE devices in the extended bridge.

In a distributed implementation, the member CB devices run RMON slave agents and the master CB device runs an RMON master agent. The PE devices, which are relatively simple and built from cheaper hardware, may not have enough processing power or memory bandwidth to run an RMON slave agent. Thus, the slave agent running on member CB devices periodically polls and collects the statistics from the PE devices. The RMON master agent running on the master CB device coordinates with the slave agents running on the member CB devices and aggregates the statistics received from the slave agents. Thus, the master CB device may incur additional processing and memory storage overhead due to RMON processing overhead. In some embodiments, these load values are periodically computed and may be criteria used for determining a master CB node in the election of a master CB node as described above by reference to block 408.

8.19 LLDP Management Protocol Processing Overhead

The LLDP protocol can be used for the discovery and maintenance of both internal network information (e.g., information associated with the extended bridge system such as 802.1BR Port-Extender topology information) as well as exterior network information (e.g., information associated with external customer networks that interconnect with the extended bridge system).

In a centralized LLDP system architecture, the IEEE-802.1AB standard LLDP discovery protocol runs on the master CB device. The master CB device in such an architecture runs discovery procedures on behalf of every CB device and every PE device that is part of the extended bridge. Through a LLDP discovery procedure, the master CB device establishes the extended bridge interior neighbor relationship (i.e., local adjacency) between the master CB device and every discovered PE device within the extended bridge. In addition, the master CB device also establishes via the LLDP discovery procedure the extended bridge exterior neighbor relationship (remote adjacency) between the master CB device and every discovered remote switching/bridging device (e.g., every customer switching/bridging device).

In a centralized LLDP and centralized CSP protocol architecture, the master CB device may incur LLDP and CSP protocol processing loads, which creates a scaling and performance bottleneck, limits the number of PE devices that can be part of the extended bridge, and limits the number of external devices (e.g., customer devices) that can be connected to the extended bridge via the data Ethernet ports of the PE devices. In order to improve performance and scaling, the extended bridge topology may support a distributed and load-balanced architecture. In such an architecture, each CB device and PE device independently runs an LLDP protocol instance and a CSP protocol instance. Such a distributed architecture may balance the processing overhead of both LLDP and CSP protocols across the CB devices and PE devices within the extended bridge topology.

In both centralized and distributed architectures, the CB devices may incur an LLDP and CSP protocol processing overhead that is proportional to a number of PE devices present in the extended bridge topology, a number of interior ports of PE devices that are enabled to run an IEEE 802.1BR CSP protocol, a number of Ethernet data ports (e.g., Ethernet data ports of customers) on the CB device, and a number of Ethernet data ports (e.g., Ethernet data ports of customers) on the edge PE devices that directly connect to the edge devices (e.g., edge devices of customers).

Each CB device can measure the control message processing load of LLDP and CSP protocols based on the number of LLDP and CSP protocol messages that are sent and received in each CB device, the size of such protocol messages, and the percentage of CPU computational power used in processing the LLDP and CSP protocol packets. Each CB device may periodically measure (e.g., based on network policy of extended bridge topology) these processing loads (also referred to as the discovery load metric) and calculate an averaged of such processing loads using the EWMA equation mentioned above where $P(n)$ represents the measured processing load.

Each member CB device can report the average processing load values and the discovery load metric values to the master CB device. The master CB may maintain the received discovery load metric values and use those values to identify a minimally loaded member CB device. If the master CB device finds a member CB device with a lower discovery load metric than the master CB device, the master CB device may promote that member CB device to be the new master CB device. When the new master CB device is elected, the new master CB device can elect a member CB device among eligible member CB devices (e.g., adjacent member CB devices) to be the new standby/backup CB device. In some embodiments, the discovery load metric may be a criteria used for determining a master CB node in the election of a master CB node as described above by reference to block 408.

8.20 S-Flow Management Protocol Processing Overhead

In some embodiments, an S-Flow statistics gathering protocol agent runs in a distributed manner in each of the CB devices and PE devices. In some such embodiments, external S-Flow statistics collectors may be connected with the CB nodes of the extended bridge. S-Flow statistics gathered from the data ports (e.g., data ports of customers) of CB devices are directly sent to the external S-Flow Collectors. S-Flow statistics gathered from the data ports (e.g., data ports of customers) of PE devices are internally forwarded to the nearest CB device (e.g., the parent CB device of PE devices).

The parent CB device, which acts as an intermediate gateway for the S-Flow statistics of PE devices, consolidates the S-Flow statistics received from all the PE devices located in its rooted PE tree. The CB device then forwards the consolidated S-Flow statistics to the external S-Flow collectors. Due to the distributed processing of S-Flow traffic statistics by the CB devices in the extended bridge topology, every CB device incurs a S-Flow statistics processing overhead.

The S-Flow statistics processing overhead of a CB device depends on a number of PE devices under the rooted PE tree of the CB device, a number of data ports (e.g., data ports of customers) on the edge PE devices (e.g., PE devices that are directly connected to the edge devices (e.g., edge devices of customers)), a rate or frequency of S-Flow traffic statistics gathered from the data plane hardware forwarding engine of the PE devices. Each CB device may periodically measure these processing loads (also referred to as the S-Flow load metric) and calculate an averaged of such processing loads using the EWMA equation mentioned above where P(n) represents the measured processing load.

Each member CB device can report the average processing load values and the S-Flow load metric values to the master CB device. The master CB may maintain the received S-Flow load metric values and use those values to identify a minimally loaded member CB device. If the master CB device finds a member CB device with a lower S-Flow load metric than the master CB device, the master CB device may promote that member CB device to be the new master CB device. When the new master CB device is elected, the new master CB device can elect a member CB device among eligible member CB devices (e.g., adjacent member CB devices) to be the new standby/backup CB device. In some embodiments, the S-Flow load metric may be a criteria used for determining a master CB node in the election of a master CB node as described above by reference to block 408.

8.21 System Logging, Alarm and Event Report Processing Overhead in the Extended Bridge Fabric In some embodiments, each of the CB devices and PE devices in the extended bridge can generate a SYSLOG message, an alarm, or an event due to platform level fault conditions or layer-2 or layer-3 protocol state changes. Remote PE devices and member CB devices send reports of such SYSLOG messages, alarms, and event to the master CB device. As a result, the master CB device can incur processing overhead for managing the SYSLOG, alarm, and event reports. Such processing overhead may depend on a number of PE devices in the extended bridge, a number of member CB devices in the extended bridge, a number of applications running on the PE devices and member CB devices that generate SYSLOG, alarm, and event reports, and a rate or frequency of such SYSLOG, alarm, and event reports generated.

Each CB device may periodically measure processing loads for generating the SYSLOG, alarms, and events (also referred to as the logging load metric) and calculate an averaged of such processing loads using the EWMA equation mentioned above where P(n) represents the measured processing load. Each member CB device can report the average processing load values and the logging load metric values to the master CB device. The master CB may maintain the received logging load metric values and use those values to identify a minimally loaded member CB device. If the master CB device finds a member CB device with a lower logging load metric than the master CB device, the master CB device may promote that member CB device to be the new master CB device. When the new master CB device is elected, the new master CB device can elect a member CB device among eligible member CB devices (e.g., adjacent member CB devices) to be the new standby/backup CB device. In some embodiments, the logging load metric may be a criteria used for determining a master CB node in the election of a master CB node as described above by reference to block 408.

8.22 Network Virtualization Protocol Processing Overhead in the Extended Bridge Fabric In some embodiments, the CB nodes in extended bridge 100 may play the role of network virtualization edge (NVE) switches and can tunnel VDC traffic across, e.g., the public IP backbone. In these embodiments, customer traffic (i.e., traffic originated from a local VDC's VMs on hypervisors attached to the edge PE nodes) can be received as e-tagged virtualized traffic at local CB nodes. The virtualized traffic can then be tunneled by the local CB nodes using an appropriate tunneling protocol (e.g., VXLAN or network virtualization using GRE (NVGRE)) to one or more remote CB nodes, which are NVE switches of one or more remote VDCs. The remote CB nodes can further forward the virtualized traffic through the remote PE network to one or more VMs at the remote VDCs.

In some VDC scenarios, one or more tenant VM(s) may move from a local server's hypervisor to a remote server's hypervisor (known as VM mobility). The movement of a VM in an extended bridge topology with PE nodes will typically follow the following path: local hypervisor→local PE network→VXLAN/NVGRE tunnel→remote PE network→remote hypervisor.

8.23 NVO3 Protocol Overhead Constrained Master CB Election

In the extended bridge topology, the master CB device may be configured to act as a NVE switch. An NVE mode switch in the extended bridge topology can facilitate the routing of virtualized traffic received from local PE devices to remote PE devices of the VDC and the routing of virtualized traffic received from other remote NVE switches to the local PE devices. The virtualized traffic to and from PE devices can be e-tagged traffic that are entering into and exiting from the PE devices, which may be connected to tenants of the VDC (e.g., a group of Virtual Machines (VMs)).

In order to facilitate routing of virtualized (i.e. e-tagged) traffic from/to PE devices between local and remote virtualized data centers (VDC), the master CB device, acting as an NVE switch, may perform encapsulation/decapsulation of traffic of the PE devices using an IETF standard VXLAN or NVGRE tunnels. The VXLAN or NVGRE tunnels can be statically configured or dynamically signaled. In either case, the master CB device of the extended bridge topology plays an important role in tunnel setup, maintenance, and facilitating e-tag traffic encapsulation/de-capsulation into/from the VXLAN/NVGRE tunnels.

The master CB device acting as an NVE switch can distribute its local virtual network information to other remote NVE switches using an IETF standard dynamic multi-protocol BGP (MP-BGP) routing update mechanism. Alternatively, the master CB device may distribute its local virtual network information to a central directory lookup agent (e.g., a network virtualization agent (NVA) based on an IETF NVO3 standard). This way, the local NVE switch can route the traffic of local PE devices to remote NVE switches in order to reach remote PE devices. Similarly, remote NVE switches can route traffic from remote PE devices to the local NVE switch so that the local NVE switch can route the traffic to the local PE devices. As such, the master CB device while acting as an NVE switch for the VDC can incur significant processing overhead that depends on a number of virtualized traffic flows from PE devices that are routed to remote PE devices of the VDC and a number of VXLAN and NVGRE tunnels used for routing traffic of the PE devices over the network virtualization overlay of the VDC.

For performance and scaling reasons, the extended bridge topology may provide a hierarchical NVE architecture. In such an architecture, each member CB device can function as an NVE switch for traffic from/to one or more of the PE trees in the extended bridge topology. In some embodiments, the master CB device controls the NVE functionalities of the member CB devices. All the CB devices may collectively be represented as a single logical NVE switch to the external NVE switches that are part of the same VDC in the NVO3 overlay. For redundancy and resiliency purposes, a single PE device may be connected to multiple CB devices that are functioning as NVE switches. Such a scenario can facilitates dual-homing and/or multi-homing of PE device-based VDC tenants against member CB NVE switch failures.

The NVE functional roles in the CB devices can incur processing overhead. Such processing over can be periodically measured based on VXLAN or NVGRE tunnel traffic statistics, tunnel maintenance control protocol processing overhead, and virtual network reachability information distribution by the NVE switches. Each CB device may periodically measure these processing loads (also referred to as the NVO3 load metric) and calculate an averaged of such processing loads using the EWMA equation mentioned above where P(n) represents the measured processing load.

Each member CB device can report the average processing load values and the NVO3 load metric values to the master CB device. The master CB may maintain the received NVO3 load metric values and use those values to identify a minimally loaded member CB device. If the master CB device finds a member CB device with a lower NVO3 load metric than the master CB device, the master CB device may promote that member CB device to be the new master CB device. In some embodiments, the NVO3 load metric may be a criteria used for determining a master CB node in the election of a master CB node as described above by reference to block 408.

8.24 NVO3 Protocol Overhead Constrained Standby/Backup CB Election

Once a NVO3 load metric based master CB device selection is performed, the new master CB device can select the standby/backup-CB an eligible member CB devices (e.g., adjacent member CB devices) of the extended bridge topology to be the standby/backup CB device. If the master CB selection results in a switchover from the existing master CB device to another member CB device (e.g., a more optimal member CB device), then the switchover can be performed in a graceful manner using make-before-break mechanism so that none of the currently transported services of the VDC between local PE devices and remote PE devices are affected. If the new master CB device elects a new standby/backup CB device, then a switchover from the current standby/backup CB device to the new standby/backup CB device can be performed in a graceful manner via the make-before-break mechanism. In some embodiments, a make-before-break mechanism may include moving any control functionality from a first member CB device to a second member CB device, creating and activating such control functionality on the second member CB before deleting or deactivating the control functionality from the first member CB device.

In a VDC, VM mobility may involve detaching a VM from one local NVE switch and reattaching the VM to another local NVE switch or reattaching the VM to a remote NVE switch within the same VDC across the public IP backbone underlay network. Electing master CB devices and standby/backup CB devices based on resource usage and load of the extended bridge system can create load-balanced and optimal paths for virtualized traffic between local and remote PE devices within the local and remote extended bridging topologies. Since the edge PE devices in the extended bridge topology are directly connected to the tenants of the VDC (e.g., a group of VMs), the virtualized traffic between PE devices and CB NVE switches are representative of the traffic of the VM. In other words, resource optimized and load balanced selection of master CB NVE switches and standby/backup CB NVE switches can also facilitate an optimal and load balanced VM mobility operation in a VDC.

8.25 SDN & Open-Flow Protocol Processing Overhead in the Extended Bridge Fabric

In certain embodiments, external software-defined networking (SDN) controllers, such as Open-Flow-based controllers, can be used to provision and control the CB Nodes of an extended bridge topology. In these embodiments, the runtime parameter values collected by the topology nodes can be exported to the SDN controller's domain path computation engine (PCE) clusters.

The PCE clusters can run a series of combinatorial optimization algorithms to choose an optimal PE tree network, which can then be provisioned by the SDN controller (e.g., an Open-Daylight controller).

8.26 Open-Flow Protocol Overhead Constrained Master-CB Election

In the extended bridge, the master CB device can run the Open-Flow agent protocol component that communicates with external Open-Flow controllers and receives instructions on what traffic flows to be programmed in the data plane flow classification hardware of the router/switching devices. Since the master CB device is responsible for receiving and maintaining the control and management information from Open-Flow controller as well as provisioning the traffic flow rules on the hardware forwarding engine, the master CB device may incur more control processing and communication overhead compared to the other member CB device in the extended bridge.

In a centralized architecture, the master CB device can run an Open-Flow agent protocol. To minimize or balance overall computational processing loads, the member CB device that has an overall minimal processing load can be considered as a candidate to be the master CB device. The master CB device can receives load reports from all other member CB devices. In this manner, the master CB device has a global view of the control and management processing loads of each of the member CB devices in the extended bridge. If the master CB device finds a member CB device that has a lower processing load then the master CB device, the master CB device can promote that member CB device to be the new master CB device. In such a case, a master CB device switchover process is performed.

In a distributed Open-Flow agent architecture, each member CB device may run a slave instance of an Open-Flow Agent (OFA) while the master CB device may run a master instance of the Open-Flow Agent. In such an architecture, the master instance the OFA receives traffic flow provisioning/de-provisioning commands from external Open-Flow Controllers (OFCs) and distributes those commands internally to the slave OFAs. Each member CB device may thus incur computational and communication overhead (also referred to as a computational and communication load metric). Each member CB device can measure this overhead and report it to the master CB device.

The master CB device can use the received overhead values to identify a minimally loaded member CB device. If the master CB device finds a member CB device with a lower load metric than the master CB device, the master CB device may promote that member CB device to be the new master CB device. When the new master CB device is elected, the new master CB device can elect a member CB device among eligible member CB devices (e.g., adjacent member CB devices) to be the new standby/backup CB device. In some embodiments, the computational and communication load metric may be a criteria used for determining a master CB node in the election of a master CB node as described above by reference to block 408.

8.27 Extended Bridge Reliability

In order to support various applications, an extended bridge needs to be highly reliable. Since different software and hardware equipment components can fail over a period of time, the reliability of extended bridge as a whole is dependent on the failure characteristics of its components. In general, the longer a given component is in service, the more likely a failure is expected in that component. Each component has its own failure characteristics.

Component failure rates may not be constant; rather, it changes over the lifetime of the component. Thus, the system level reliability of an extended bridge may decrease over time due to the aggregate effect of components aging and failure rates increasing. Since the reliability of a system decreases over time, it reaches the lowest acceptable level at some point. Then, maintenance service is performed to bring the system back to an acceptable level and this process is repeated.

The following terminology will be used in the description of this section:

MTBF—The mean time between successive failures of a component. This can be estimated by dividing a time interval by the number of failures in the time interval provided that a sufficient number of failures have occurred during the time interval.

Failure Rate—The mean number of failures of a component per unit interval time. This is expressed as a number of failures per year.

MTTR—The mean time to repair or replace a failed component. This can be estimated as an average repair time, by dividing the sum of repair times by the number of repairs occurred during that time.

Repair Rate—This is the reciprocal of the MTTR value.

Availability—The long term average fraction of time that a component or whole system is in service and performing its intended function.

Frequency of System Failure—The mean number of system failures per unit time.

Expected Failure Duration—The expected or long term average duration of a single failure event.

System level reliability of an extended bridge depends on how the components are connected together to form the system. Since the master CB device and the standby/backup CB devices in an extended bridge are important, those devices may be required to be more reliable and available than other member CB devices.

In some embodiments, the extended bridge (or an external network management system) stores the reliability and availability parameters mentioned above as well as the service performance measurement or benchmarking data of components. The above measured parameters can be used as constraints in the master CB device election process. The component failure behaviors can be mathematically represented using an exponential probability distribution. For example, in calculating system level reliability of an extended bridge, the connectivity of the master CB device and the standby/backup CB device with other member CB devices are used.

When there are M number of parallel links or an aggregate link between the master CB device and the standby/backup CB device or other member CB, the links can be considered as, in graph theory, a minimal cut set of the extended bridge system graph. In other words, all of the M component links must fail for the cut set to fail in the extended bridge. The probability P(i) of failure for a single component link ($L_i$) can be calculated as the following:

$$P(i) = \frac{MTTR(i)}{MTTR(i) + MTBF(i)}.$$

Since the failures of the component links are independent, the probability of failure of the entire cut set C is the product of the failure probabilities of the individual component links.

Thus $$C = \prod \frac{MTTR(i)}{MTTR(i) + MTBF(i)} 1 \le i \le M.$$

In some embodiments, these reliability probabilities may be criteria used for determining a master CB node in the election of a master CB node as described above by reference to block 408.

In some embodiments, an extended bridge may be comprised of homogeneous routing/switching devices (e.g., devices manufactured by the same product vendor). As the extended bridge is utilized, different routing/switching devices in the extended bridge may be utilized to different degrees. The utilization of routing/switching devices can depend on the traffic flow characteristics (e.g., traffic flow characteristics of customers) and the dynamics of traffic patterns passing through the internal network of the extended bridge. Some routing/switching devices may be over-utilized for traffic processing (e.g., processing of customer traffic) compared to other routing/switching devices.

During the course of certain deployments of extended bridges (e.g., campus networks, data center networks, high performance scientific computing clusters, virtualized storage networks etc.) one or more existing devices may be replaced by a newer generation of routing/switching devices in order to provide more sophisticated services or services with higher scale and performance. Additionally, some existing routing/switching devices may undergo maintenance services at different points of its lifetime. Thus, during the lifetime of an extended bridge, different parts of the extended bridge (e.g., different routing/switching devices) may encounter different life expectancies (i.e. different reliabilities). It can be important in an extended bridge consisting of routing/switching devices with different reliabilities to dynamically and periodically choose a master CB device that is more reliable compared to other CB devices in the extended bridge. This way, if one or more less-reliable member CB devices go down due to hardware and/or software failures, the rest of the extended bridge can continue to function seamlessly with reduced bandwidth capacity or reduced scale and performance levels.

Each member CB device can periodically compute its overall reliability using statistical methods (e.g., the reliability probability technique described above) and reports an abstract reliability measurement to the master CB device. The master CB device may maintain the received reliability measurements from all the member CB device and use the reliability measurements to identify member CB device with the highest reliability measurement. If the master CB device finds a member CB device with a reliability measurements higher than the master CB device, the master CB device may promote that member CB device to be the new master CB device. When the new master CB device is elected, the new master CB device can elect a member CB device among eligible member CB devices (e.g., adjacent member CB devices) having the highest reliability measurement to be the new standby/backup CB device. In some embodiments, the reliability measurement metric may be a criteria used for determining a master CB node in the election of a master CB node as described above by reference to block 408.

8.28 High Availability Protocol Database Replication Overhead

For high availability (HA) reasons or to facilitate a hitless failover mechanism for all services transported by the extended bridge, the master CB device may be responsible for replicating all statically configured and dynamically learned layer-2/layer-3 protocol states and platform layer infrastructure software operational states from the master CB device to the standby/backup CB device. In the event of the master CB device failing, the standby/backup CB device can take over as the master CB device and continue providing services to external users.

When the extended bridge supports a 1:1 primary/backup redundancy model, the master CB device can incur a HA replication processing overhead associated with one standby/backup CB device. When the extended bridge supports a 1:N primary/backup redundancy model where there are N number of standby/backup CB devices available for a single primary master CB device, the primary master CB device may replicate the static and dynamic protocol states to N number of standby/backup CB devices, which results in N times the HA replication processing overhead.

The HA replication processing overhead (also referred to as the replication load metric) can be measured using the EWMA equation mentioned above where P(n) represents the measured overhead. Such processing overhead can be based on the size of control messages for HA replication sent from the master CB device to the standby/backup CB devices. In some embodiments, the replication load metric may be a criteria used for determining a master CB node in the election of a master CB node as described above by reference to block 408.

8.29 Extended Bridge Fabric Load Management

In some embodiments, each PE device can be monitored for various types of traffic counters. The traffic counter monitoring may be performed at all levels of the PE Tree (i.e. edge PE devices, transit PE devices, and the root CB devices). Examples of types of traffic counter include congestion drops, traffic peak volume, and broadcast storms; firewall match or failure counters; volume of traffic sent to the software stack of the CPU for analysis; traffic generated and received by various control protocols (e.g., IGP/BGP routing protocols, multicast routing protocols, layer-2 control protocols at the root CB device, etc.); memory resource availabilities and resource depletion rates; link bandwidth availabilities; hardware forwarding engine resource availabilities, ACL rule processing engine (e.g., TCAM) resource availabilities; control plane processor capabilities, utilizations, failure rates, etc.; electrical energy utilization, electrical noise, thermal noise, and temperature gradients; etc.

The various resource utilization and traffic processing overhead can be tracked by periodically monitoring the parameters and averaging them using an ARMA model. An ARMA model can be defined using the EWMA mentioned above where P(n) represents the measured parameter. These averaged parameter estimates can be collected by the transit PE devices from the edge PE devices and then reported to the parent CB devices. The periodic collection and reporting of such parameters can be further optimized by defining minimum and maximum thresholds for each parameter and reporting only when thresholds are hit. The CB devices of the extended bridge system can dynamically exchange these parameter averages as normalized numerical quantities among themselves via flooding at the CB level ring or mesh topology. After sending and receiving these parameter average estimate values, the CB devices can construct a resource mapping graph of the CB layer topology to locate and identify the CB device that is minimally loaded and has maximum amount of resources available. In some embodiments, this criteria (i.e., the CB device that is minimally loaded and has maximum amount of resources available) may be used for determining a master CB node in the election of a master CB node as described above by reference to block 408.

9. Example Network Device

Figure 7:
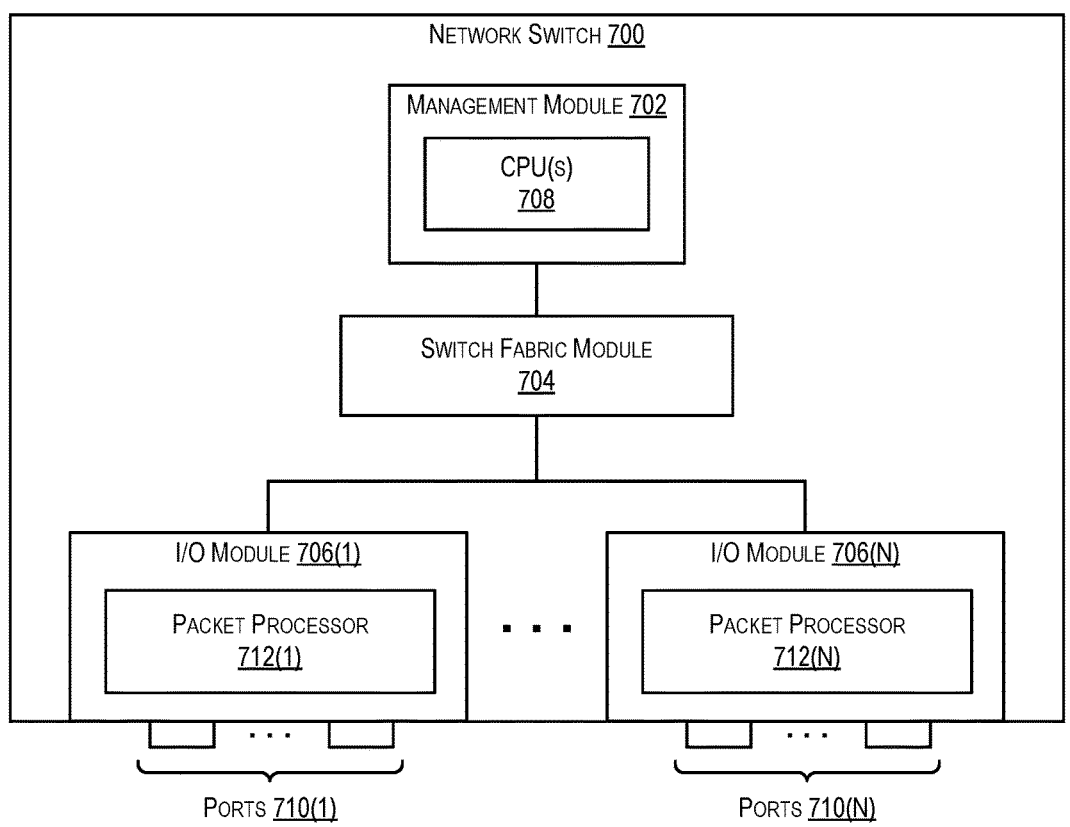
FIG. 7 depicts an example network device according to an embodiment.

FIG. 7 depicts an example network device (e.g., a switch, a router, etc.) 700 according to an embodiment. Network device 700 can be used to implement any of the nodes shown in extended bridge topology 100 of FIG. 1. As shown in FIG. 7, As shown, network device 700 includes a management module 702, a switch fabric module 704, and one or more I/O modules (i.e., line cards) 706(1)-706(N). Management module 702 includes one or more management CPUs 708 for managing/controlling the operation of the switch/router. Each management CPU 708 can be a general purpose processor, such as a PowerPC, Intel, AMD, or ARM-based processor, that operates under the control of software stored in an associated memory (not shown).

Switch fabric module 704 and I/O modules 706(1)-706(N) collectively represent the data, or forwarding, plane of network device 700. Switch fabric module 704 is configured to interconnect the various other modules of network device 700. Each I/O module 706(1)-706(N) can include one or more input/output ports 710(1)-710(N) that are used by network device 700 to send and receive data packets. Each I/O module 706(1)-706(N) can also include a packet processor 712(1)-712(N). Packet processor 712(1)-712(N) is a hardware processing component (e.g., an FPGA or ASIC) that can make wire speed decisions on how to handle incoming or outgoing data packets.

It should be appreciated that network device 700 is illustrative and not intended to limit embodiments of the present disclosure. Many other configurations having more or fewer components than network device 700 are possible.

10. Example Computer System

Figure 8:
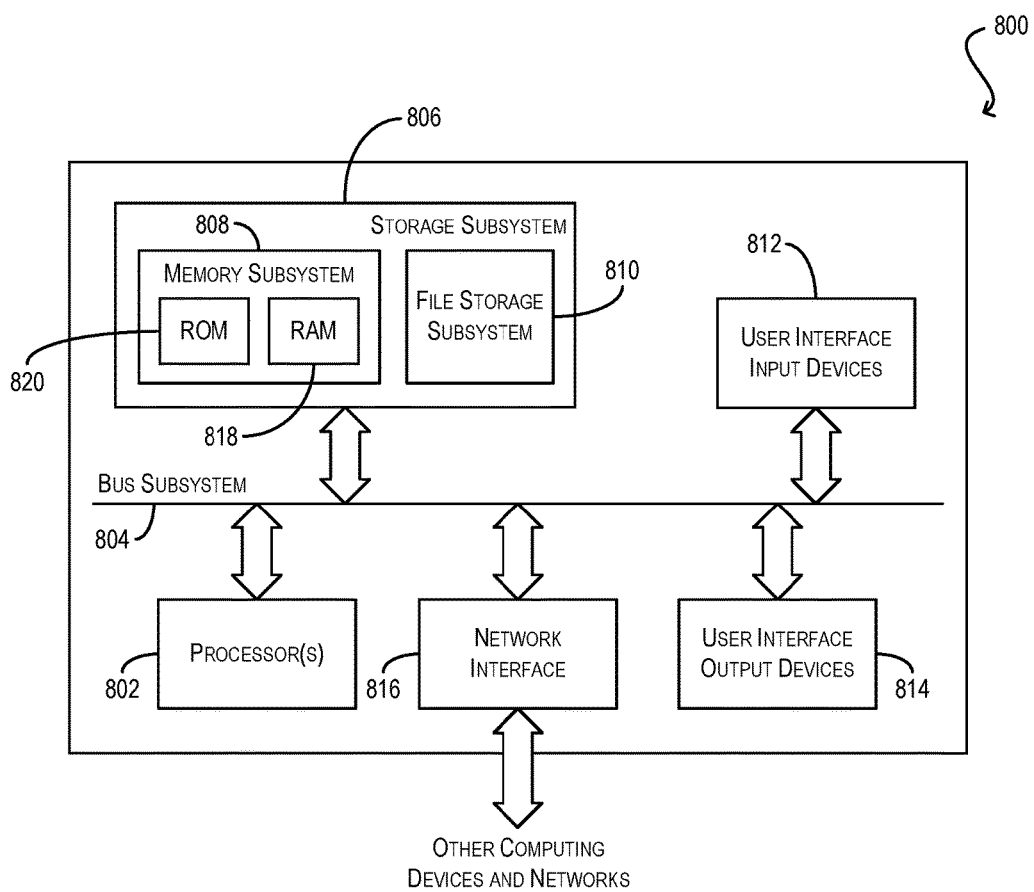
FIG. 8 depicts an example computer system according to an embodiment.

FIG. 8 depicts an example computer system 800 according to an embodiment. Computer system 800 can be used to implement a virtual version of the network device configured to carry out flowchart 400 of FIG. 4. As shown in FIG. 8, computer system 800 can include one or more processors 802 that communicate with a number of peripheral devices via a bus subsystem 804. These peripheral devices can include a storage subsystem 806 (comprising a memory subsystem 808 and a file storage subsystem 810), user interface input devices 812, user interface output devices 814, and a network interface subsystem 816.

Bus subsystem 804 can provide a mechanism for letting the various components and subsystems of computer system 800 communicate with each other as intended. Although bus subsystem 804 is shown schematically as a single bus, alternative embodiments of the bus subsystem can utilize multiple busses.

Network interface subsystem 816 can serve as an interface for communicating data between computer system 800 and other computing devices or networks. Embodiments of network interface subsystem 816 can include wired (e.g., coaxial, twisted pair, or fiber optic Ethernet) and/or wireless (e.g., Wi-Fi, cellular, Bluetooth, etc.) interfaces.

User interface input devices 812 can include a keyboard, pointing devices (e.g., mouse, trackball, touchpad, etc.), a scanner, a barcode scanner, a touch-screen incorporated into a display, audio input devices (e.g., voice recognition systems, microphones, etc.), and other types of input devices. In general, use of the term "input device" is intended to include all possible types of devices and mechanisms for inputting information into computer system 800.

User interface output devices 814 can include a display subsystem, a printer, a fax machine, or non-visual displays such as audio output devices, etc. The display subsystem can be a cathode ray tube (CRT), a flat-panel device such as a liquid crystal display (LCD), or a projection device. In general, use of the term "output device" is intended to include all possible types of devices and mechanisms for outputting information from computer system 800.

Storage subsystem 806 can include a memory subsystem 808 and a file/disk storage subsystem 810. Subsystems 808 and 810 represent non-transitory computer-readable storage media that can store program code and/or data that provide the functionality of various embodiments described herein.

Memory subsystem 808 can include a number of memories including a main random access memory (RAM) 818 for storage of instructions and data during program execution and a read-only memory (ROM) 820 in which fixed instructions are stored. File storage subsystem 810 can provide persistent (i.e., non-volatile) storage for program and data files and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 800 is illustrative and not intended to limit embodiments of the present invention. Many other configurations having more or fewer components than computer system 800 are possible.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
   determining, by a controlling bridge (CB) node that is part of a plurality of CB nodes in an extended bridge, a set of local configuration parameters and a set of local runtime parameters, the set of local runtime parameters comprising an amount of control protocol traffic load currently handled by the CB node;
   broadcasting, by the CB node, the set of local configuration parameters and the set of local runtime parameters to other CB nodes in the plurality of CB nodes;
   receiving, by the CB node, a set of configuration parameters and a set of runtime parameters from each of the other CB nodes, the set of runtime parameters comprising an amount of control protocol traffic load currently handled by each of the other CB nodes; and
   determining, by the CB node, a particular CB node in the plurality of CB nodes to be a master CB node of the extended bridge based on the set of local configuration parameters, the set of local runtime parameters, the set of configuration parameters received from said each of the other CB nodes, and the set of runtime parameters received from said each of the other CB nodes.

2. The method of claim 1 further comprising, when the determined particular CB node is the CB node, broadcasting to the other CB nodes in the plurality of CB nodes a message declaring that the CB node is the master CB node.

3. The method of claim 2 further comprising:
   receiving a vote from each of the other CB nodes; and
   operating as the master CB node of the extended bridge based on the vote received from said each of the other CB nodes.

4. The method of claim 1, wherein the extended bridge further comprises a set of port extender (PE) nodes rooted under the CB node, and wherein determining the set of local runtime parameters comprises receiving parameters from the set of port extender (PE) nodes.

5. The method of claim 1, wherein the local set of configuration parameters comprises a priority value associated with the CB node, and wherein the set of configuration parameters comprises a priority value associated with said each of the other CB nodes.

6. The method of claim 1 further comprising:
   when the determined particular CB node is not the CB node, receiving a message declaring that another CB node in the plurality of CB nodes is the master CB node;
   upon determining that the particular CB node is the same as the another CB node, broadcasting to the other CB nodes in the plurality of CB nodes a vote accepting the another CB node as the master CB node; and
   upon determining that the particular CB node is not the same as the another CB node, broadcasting to the other CB nodes in the plurality of CB nodes a vote rejecting the another CB node as the master CB node.

7. A non-transitory computer readable storage medium having stored thereon program code executable by a controlling bridge (CB) node in a plurality of CB nodes of an extended bridge, the program code causing the CB node to:
- determine a set of local configuration parameters and a set of local runtime parameters, the set of local runtime parameters comprising an amount of control protocol traffic load currently handled by the CB node;
- broadcast the set of local configuration parameters and the set of local runtime parameters to other CB nodes in the plurality of CB nodes;
- receive a set of configuration parameters and a set of runtime parameters from each of the other CB nodes in the plurality of CB nodes, the received set of runtime parameters comprising an amount of control protocol traffic load currently handled by each of the other CB nodes; and
- determine a particular CB node in the plurality of CB nodes to be a master CB node of the extended bridge based on the set of local configuration parameters, the set of local runtime parameters, the set of configuration parameters received from said each of the other CB nodes, and the set of runtime parameters received from said each of the other CB nodes.

8. The non-transitory computer readable storage medium of claim 7, wherein the program code further causes the CB node to, when the determined particular CB node is the CB node, broadcast to the other CB nodes in the plurality of CB nodes a message declaring that the CB node is the master CB node.

9. The non-transitory computer readable storage medium of claim 8, wherein the program code further causes the CB node to:
- receive a vote from said each of the other CB nodes; and
- operate as the master CB node of the extended bridge system based on the vote received from said each of the other CB nodes.

10. The non-transitory computer readable storage medium of claim 7, wherein the extended bridge system further comprises a set of port extender (PE) nodes rooted under the CB node, and wherein determining the set of local runtime parameters comprises receiving parameters from the set of port extender (PE) nodes.

11. The non-transitory computer readable storage medium of claim 7, wherein the local set of configuration parameters comprises a priority value associated with the CB node, and wherein the set of configuration parameters comprises a priority value associated with said each of the other CB nodes.

12. The non-transitory computer readable storage medium of claim 7, wherein the program code further causes the CB node to:
- when the determined particular CB node is not the CB node, receive a message declaring that another CB node in the plurality of CB nodes is the master CB node;
- upon determining that the particular CB node is the same as the another CB node, broadcast to the other CB nodes in the plurality of CB nodes a vote accepting the another CB node as the master CB node; and
- upon determining that the particular CB node is not the same as the another CB node, broadcast to the other CB nodes in the plurality of CB nodes a vote rejecting the another CB node as the master CB node.

13. A network device acting as a controlling bridge (CB) node in a plurality of CB nodes of an extended bridge, the network device comprising:
- a processor; and
- a non-transitory computer readable medium having stored thereon program code that, when executed by the processor, causes the processor to:
  - determine a set of local configuration parameters and a set of local runtime parameters, the set of local runtime parameters comprising an amount of control protocol traffic load currently handled by the CB node;
  - broadcast the set of local configuration parameters and the set of local runtime parameters to other CB nodes in the plurality of CB nodes;
  - receive a set of configuration parameters and a set of runtime parameters from each of the other CB nodes in the plurality of CB nodes, the set of runtime parameters comprising an amount of control protocol traffic load currently handled by each of the other CB nodes; and
  - determine a particular CB node in the plurality of CB nodes to be a master CB node of the extended bridge based on the set of local configuration parameters, the set of local runtime parameters, the set of configuration parameters received from said each of the other CB nodes, and the set of runtime parameters received from said each of the other CB nodes.

14. The network device of claim 13, wherein the program code further causes the processor to, when the determined particular CB node is the CB node, broadcast to the other CB nodes in the plurality of CB nodes a message declaring that the CB node is the master CB node.

15. The network device of claim 14, wherein the program code further causes the processor to:
- receive a vote from said each of the other CB nodes; and
- operate as the master CB node of the extended bridge system based on the vote received from said each of the other CB nodes.

16. The network device of claim 13, wherein the extended bridge system further comprises a set of port extender (PE) nodes rooted under the CB node, and wherein determining the set of local runtime parameters comprises receiving parameters from the set of port extender (PE) nodes.

17. The network device of claim 13, wherein the local set of configuration parameters comprises a priority value associated with the CB node, and wherein the set of configuration parameters comprises a priority value associated with said each of the other CB nodes.

18. The network device of claim 13, wherein the program code further causes the processor to:
- when the determined particular CB node is not the CB node, receive a message declaring that another CB node in the plurality of CB nodes is the master CB node;
- upon determining that the particular CB node is the same as the another CB node, broadcast to the other CB nodes in the plurality of CB nodes a vote accepting the another CB node as the master CB node; and
- upon determining that the particular CB node is not the same as the another CB node, broadcast to the other CB nodes in the plurality of CB nodes a vote rejecting the another CB node as the master CB node.

19. A method comprising:
- determining, by a controlling bridge (CB) node that is part of a plurality of CB nodes in an extended bridge, a set of local configuration parameters and a set of local runtime parameters;

broadcasting, by the CB node, the set of local configuration parameters and the set of local runtime parameters to other CB nodes in the plurality of CB nodes;

receiving, by the CB node, a set of configuration parameters and a set of runtime parameters from each of the other CB nodes;

determining, by the CB node, a particular CB node in the plurality of CB nodes to be a master CB node of the extended bridge based on the set of local configuration parameters, the set of local runtime parameters, the set of configuration parameters received from said each of the other CB nodes, and the set of runtime parameters received from said each of the other CB nodes;

when the determined particular CB node is the CB node, broadcasting, by the CB node to the other CB nodes in the plurality of CB nodes, a message declaring that the CB node is the master CB node;

receiving, by the CB node, a vote from said each of the other CB nodes; and operating, by the CB node, as the master CB node of the extended bridge based on the vote received from said each of the other CB nodes.

20. A method comprising:

determining, by a controlling bridge (CB) node that is part of a plurality of CB nodes in an extended bridge, a set of local configuration parameters and a set of local runtime parameters;

broadcasting, by the CB node, the set of local configuration parameters and the set of local runtime parameters to other CB nodes in the plurality of CB nodes;

receiving, by the CB node, a set of configuration parameters and a set of runtime parameters from each of the other CB nodes;

determining, by the CB node, a particular CB node in the plurality of CB nodes to be a master CB node of the extended bridge based on the set of local configuration parameters, the set of local runtime parameters, the set of configuration parameters received from said each of the other CB nodes, and the set of runtime parameters received from said each of the other CB nodes;

when the determined particular CB node is not the CB node, receiving, by the CB node, a message declaring that another CB node in the plurality of CB nodes is the master CB node;

upon determining that the determined particular CB node is the same as the another CB node, broadcasting, by the CB node to the other CB nodes in the plurality of CB nodes, a vote accepting the another CB node as the master CB node; and upon determining that the determined particular CB node is not the same as the another CB node, broadcasting, by the CB node to the other CB nodes in the plurality of CB nodes, a vote rejecting the another CB node as the master CB node.

* * * * *